US006911650B1

(12) United States Patent
Park

(10) Patent No.: US 6,911,650 B1
(45) Date of Patent: Jun. 28, 2005

(54) METHOD AND APPARATUS FOR MULTIPLE FREQUENCY MULTIPOLE

(75) Inventor: Melvin A. Park, Billerica, MA (US)

(73) Assignee: Bruker Daltonics, Inc., Billerica, MA (US)

( * ) Notice: Subject to any disclaimer, the term of this patent is extended or adjusted under 35 U.S.C. 154(b) by 0 days.

(21) Appl. No.: 09/374,477

(22) Filed: Aug. 13, 1999

(51) Int. Cl.[7] .......... B01D 59/44
(52) U.S. Cl. .......... 250/292; 250/282
(58) Field of Search .......... 250/292, 282

(56) References Cited

U.S. PATENT DOCUMENTS

| | | | | | |
|---|---|---|---|---|---|
| 4,403,147 | A | | 9/1983 | Melera et al. | |
| 4,963,736 | A | | 10/1990 | Douglas et al. | |
| 5,030,826 | A | | 7/1991 | Hansen | |
| 5,089,703 | A | * | 2/1992 | Schoen et al. | 250/292 |
| 5,179,278 | A | | 1/1993 | Douglas | |
| 5,304,798 | A | | 4/1994 | Tomany et al. | |
| 5,306,910 | A | | 4/1994 | Jarrell et al. | |
| 5,432,343 | A | | 7/1995 | Gulcicek et al. | |
| 5,436,446 | A | | 7/1995 | Jarrell et al. | |
| 5,495,108 | A | | 2/1996 | Apffel, Jr. et al. | |
| 5,652,427 | A | | 7/1997 | Whitehouse et al. | |
| 5,689,111 | A | | 11/1997 | Dresch et al. | |
| 5,708,268 | A | | 1/1998 | Franzen | |
| 5,736,741 | A | | 4/1998 | Bertsch et al. | |
| 5,739,530 | A | | 4/1998 | Franzen et al. | |
| 5,750,988 | A | | 5/1998 | Apffel et al. | |
| 5,753,910 | A | | 5/1998 | Gourley et al. | |
| 5,811,800 | A | | 9/1998 | Franzen et al. | |
| 5,825,026 | A | | 10/1998 | Baykut | |
| 5,838,003 | A | | 11/1998 | Bertsch et al. | |
| 5,852,294 | A | | 12/1998 | Gulcicek et al. | |
| 5,939,718 | A | * | 8/1999 | Yamada et al. | 250/288 |
| 6,075,244 | A | * | 6/2000 | Baba et al. | 250/292 |

OTHER PUBLICATIONS

Boyle, J., et al., "An Ion Storage Time–of–Flight Mass Spectrometer for Analysis of Electrospray Ions," Rapid Commun. Mass Spectrom. 5, 400 (1991).
McIver, Robert T., et al., "Matrix Assisted Laser Desorption/Ionization with an External Ion Source Fourier–Transform Mass Spectrometer," Rapid Commun. Mass Spectrom. 8(3), 237 (1994).
Shaffer, S.A., et al., A Novel Ion Funnel for Focusing Ions at Elevated Pressure Using Electrospray Ionization Spectrometry, Rapid Comm. Mass Spectrom. 11, 1813 (1997).
Tolmachev, A.V., et al., "Ion Focusing Characteristics of the Stacked Ring 'Ion Funnel' Operating at Elevated Pressures," Proceedings of the 47th ASMS Conference on Mass Spectrometry and Allied Topics, 1999.

* cited by examiner

*Primary Examiner*—Nikita Wells
*Assistant Examiner*—Zia R Hashini
(74) *Attorney, Agent, or Firm*—Ward & Olivo

(57) ABSTRACT

The invention relates to a means and a method for the manipulation of ions. Specifically, the invention teaches a multipole device consisting of a multitude of electrodes which are of such a geometry that the proper application of RF and DC potentials between the electrodes will result in the transmission of a broad range of m/z ions through the device. The electrodes may be arranged in such a way that it also can be operated so as to select a narrow range of m/z ions for transmission through the device.

107 Claims, 17 Drawing Sheets

METHOD AND APPARATUS FOR MULTIPLE FREQUENCY MULTIPOLE

TECHNICAL FIELD OF THE INVENTION

The present invention relates generally to mass spectrometry and specifically to a means and method for guiding ions of a broad range of m/z through a pumping region to an analyzer. More particularly, the present invention discloses an ion guide comprising a multitude of electrodes and which is "driven" by a complex RF potential consisting of multiple frequency components applied in such a way to create a low frequency RF field near the boundaries of the multipole and a higher frequency field throughout the device.

BACKGROUND OF THE INVENTION

Mass spectrometry is an important tool in the analysis of a wide range of chemical compounds. Specifically, mass spectrometers can be used to determine the molecular weight of sample compounds. The analysis of samples by mass spectrometry consists of three main steps—formation of gas phase ions from sample material, mass analysis of the ions to separate the ions from one another according to ion mass, and detection of the ions. A variety of means exist in the field of mass spectrometry to perform each of these three functions. The particular combination of means used in a given spectrometer determine the characteristics of that spectrometer.

To mass analyze ions, for example, one might use a magnetic (B) or electrostatic (E) analyzer. Ions passing through a magnetic or electrostatic field will follow a curved path. In a magnetic field the curvature of the path will be indicative of the momentum-to-charge ratio of the ion. In an electrostatic field, the curvature of the path will be indicative of the energy-to-charge ratio of the ion. If magnetic and electrostatic analyzers are used consecutively, then both the momentum-to-charge and energy-to-charge ratios of the ions will be known and the mass of the ion will thereby be determined. Other mass analyzers are the quadrupole (Q), the ion cyclotron resonance (ICR), the time-of-flight (TOF), and the quadrupole ion trap analyzers.

Before mass analysis can begin, however, gas phase ions must be formed from sample material. If the sample material is sufficiently volatile, ions may be formed by electron ionization (EI) or chemical ionization (CI) of the gas phase sample molecules. For solid samples (e.g. semiconductors, or crystallized materials), ions can be formed by desorption and ionization of sample molecules by bombardment with high energy particles. Secondary ion mass spectrometry (SIMS), for example, uses keV ions to desorb and ionize sample material. In the SIMS process a large amount of energy is deposited in the analyte molecules. As a result, fragile molecules will be fragmented. This fragmentation is undesirable in that information regarding the original composition of the sample—e.g. the molecular weight of sample molecules—will be lost.

For more labile, fragile molecules, other ionization methods now exist. The plasma desorption (PD) technique was introduced by Macfarlane et al. in 1974 (Macfarlane, R. D.; Skowronski, R. P.; Torgerson, D. F., *Biochem. Biophys. Res Commoun.* 60 (1974) 616). Macfarlane et al. discovered that the impact of high energy (MeV) ions on a surface, like SIMS would cause desorption and ionization of small analyte molecules, however, unlike SIMS, the PD process results also in the desorption of larger, more labile species—e.g. insulin and other protein molecules.

Lasers have been used in a similar manner to induce desorption of biological or other labile molecules. See, for example, VanBreeman, R. B.: Snow, M.: Cotter, R. J., *Int. J. Mass Spectrom. Ion Phys.* 49 (1983) 35; Tabet, J. C.; Cotter, R. J., *Anal Chem.* 56 (1984) 1662; or Olthoff, J. K.; Lys, I.: Demirev, P.: Cotter, R. J., *Anal. Instrument.* 16 (1987) 93. Cotter et al. modified a CVC 2000 time-of-flight mass spectrometer for infrared laser desorption of involatile biomolecules, using a Tachisto (Needham, Mass.) model 215G pulsed carbon dioxide laser. The plasma or laser desorption and ionization of labile molecules relies on the deposition of little or no energy in the analyte molecules of interest. The use of lasers to desorb and ionize labile molecules intact was enhanced by the introduction of matrix assisted laser desorption ionization (MALDI) (Tanaka, K.; Waki, H.; Ido, Y.; Akita, S.; Yoshida, Y.; Yoshica, T., *Rapid Commun. Mass Spectrom.* 2 (1988) 151 and Karas, M.; Hillenkamp, F., *Anal. Chem.* 60 (1988) 2299). In the MALDI process, analyte is dissolve in a solid, organic matrix. Laser light of a wavelength that is absorbed by the solid matrix but not by analyte is used to excite the sample. The matrix is excited directly by the laser. The excited matrix sublimes into the gas phase carrying with it the analyte molecules. The analyte molecules are ionized by proton, electron, or cation transfer from the matrix molecules to the analyte molecules. MALDI is typically used in conjunction with time-of-flight mass spectrometry (TOFMS) and can be used to measure the molecular weights of proteins in excess of 100,000 daltons.

Atmospheric pressure ionization (API) includes a number of methods. Typically, analyte ions are produced from liquid solution at atmospheric pressure. One of the more widely used methods, known as electrospray ionization (ESI), was first suggested by Dole et al. (M. Dole, L. L. Mack, R. L. Hines, R. C. Mobley, L. D. Ferguson, M. B. Alice, *J. Chem. Phys.* 49, 2240, 1968). In the electrospray technique, analyte is dissolved in a liquid solution and sprayed from a needle. The spray is induced by the application of a potential difference between the needle and a counter electrode. The spray results in the formation of fine, charged droplets of solution containing analyte molecules. In the gas phase, the solvent evaporates leaving behind charged, gas phase, analyte ions. Very large ions can be formed in this way. Ions as large as 1 MDa have been detected by ESI in conjunction with mass spectrometry (ESMS).

ESMS was introduced by Yamashita and Fenn (M. Yamashita and J. B. Fenn, *J. Phys. Chem.* 88, 4671, 1984). To establish this combination of ESI and MS, ions had to be formed at atmospheric pressure, and then introduced into the vacuum system of a mass analyzer via a differentially pumped interface. The combination of ESI and MS afforded scientists the opportunity to mass analyze a wide range of samples. ESMS is now widely used primarily in the analysis of biomolecules (e.g. proteins) and complex organic molecules. In the intervening years a number of means and methods useful to ESMS and API-MS have been developed. Much work has been centered on sprayers and ionization chambers. In addition to the original electrospray technique, pneumatic assisted electrospray, dual electrospray, and nano electrospray are now also widely available. Pneumatic assisted electrospray (A. P. Bruins, T. R. Covey, and J. D. Henion, Anal. Chem. 59, 2642, 1987) uses nebulizing gas flowing past the tip of the spray needle to assist in the formation of droplets. The nebulization gas assists in the formation of the spray and thereby makes the operation of the ESI easier. Nano electrospray (M. S. Wilm, M. Mann, *Int. J. Mass Spectrom. Ion Processes* 136, 167, 1994) employs a much smaller diameter needle than the original electrospray. As a result the flow rate of sample to the tip is lower and the droplets in the spray are finer. However, the ion signal provided by nano electrospray in conjunction with MS is essentially the same as with the original electrospray. Nano electrospray is therefore much more sensitive with respect to the amount of material necessary to perform a given analysis.

Many other ion production methods might be used at atmospheric or elevated pressure. For example, MALDI has recently been adapted by Victor Laiko and Alma Burlingame to work at atmospheric pressure (Atmospheric Pressure Matrix Assisted Laser Desorption Ionization, poster #1121, $4^{th}$ International Symposium on Mass Spectrometry in the Health and Life Sciences, San Francisco, Aug. 25–29, 1998) and by Standing et al. at elevated pressures (Time of Flight Mass Spectrometry of Biomolecules with Orthogonal Injection+Collisional Cooling, poster #1272, $4^{th}$ International Symposium on Mass Spectrometry in the Health and Life Sciences, San Francisco, Aug. 25–29, 1998; and Orthogonal Injection TOFMS *Anal. Chem.* 71(13), 452A (1999)). The benefit of adapting ion sources in this manner is that the ion optics and mass spectral results are largely independent of the ion production method used.

An elevated pressure ion source always has an ion production region—wherein ions are produced—and an ion transfer region—wherein ions are transferred through differential pumping stages and into the mass analyzer. The ion production region is at an elevated pressure—most often atmospheric pressure—with respect to the analyzer. The ion production region will often include an ionization chamber. In an ESI source, for example, liquid samples are "sprayed" in the "spray chamber" to form ions.

The design of the ionization chamber used in conjunction with API-MS has had a significant impact on the availability and use of these ionization methods with MS. Prior art ionization chambers are inflexible to the extent that a given ionization chamber can be used readily with only a single ionization method and a fixed configuration of sprayers. For example, in order to change from a simple electrospray method to a nano electrospray method of ionization, one had to remove the electrospray ionization chamber from the source and replace it with a nano electrospray chamber (see also, Gourley et al. U.S. Pat. No. 5,753,910, entitled "Angled Chamber Seal for Atmospheric Pressure Ionization Mass Spectrometry").

The ion transfer region will generally include a multipole RF ion guide. Ion guides similar to that of Whitehouse et al. (U.S. Pat. No. 5,652,427) have been shown to be effective in cooling ions and in transferring them from one pressure region to another in a differentially pumped system. In the source of Whitehouse et al., ions are produced by ESI or APCI at substantially atmospheric pressure. These ions are transferred from atmospheric pressure to a first differential pumping region by the gas flow through a glass capillary. Ions are transferred from this first pumping region to a second pumping region by gas flow through a "skimmer". A multipole in the second differentially pumped region accepts the ions and guides them through a restriction leading through a restriction and into a third differentially pumped region: Meanwhile, collisions with gas flowing through the multipole "cools" the ions resulting in both more efficient ion transfer and the formation of a cool ion beam—which is more readily mass analyzed.

In the scheme of Whitehouse et al. an RF only potential is applied to the multipole. As a result, the multipole is not "selective" but rather transmits ions over a broad range of mass-to-charge (m/z) ratios. Such a range as provided by a prior art multipole is adequate for many applications, however, for some applications—particularly with MALDI—the ions produced may be well out of this range. High m/z ions such as are often produced by the MALDI ionization method are often out of the range of transmission of prior art multipoles.

In other schemes a multipole might be used to guide ions of a selected m/z through the transfer region. Morris et al. (H. R. Morris, et al., High Sensitivity Collisionally-activated Decomposition Tandem Mass Spectrometry on a Novel Quadrupole/Orthogonal-acceleration Time-of-Flight Mass Spectrometer, *Rapid Commun. Mass Spectrom.* 10, 889 (1996)) use a series of multipoles in their design. One of these is a quadrupole. The quadrupole can be run in a "wide bandpass" mode or a "narrow bandpass" mode. In the wide bandpass mode, an RF-only potential is applied to the quadrupole and ions of a relatively broad range of m/z values are transmitted. In narrow bandpass mode both RF and DC potentials are applied to the quadrupole such that ions of only a narrow range of m/z values are selected for transmission through the quadrupole. In subsequent multipoles, the selected ions may be activated towards dissociation. In this way the instrument of H. R. Morris et al. is able to perform MS/MS with the first mass analysis and subsequent fragmentation occurring in what would otherwise be simply a set of multipole ion guides.

However, this prior art design of Morris et al., when used in "wide bandpass" mode is unable to transmit as wide an m/z range as that of Whitehouse et al. above and certainly not as high an m/z ions as produced by MALDI. The Whitehouse et al. design uses a hexapole. Other prior art designs use an octapole or even a pentapole as the ion guide. Hexapoles, octapoles, and pentapoles are not as good as the Morris design for m/z selection. However, the quadrupole—used in the Morris design—cannot transmit as wide an m/z range as a hexapole, octapole, or pentapole. While some prior art multipoles might be better for transmitting ions of a broad m/z range and others might be better for ion selection, none can transmit high m/z ions such as produced in MALDI (m/z $<\sim 10^5$ Th). cl SUMMARY OF THE INVENTION One aspect of the present invention is to provide an ion guide which can guide ions of a broad range of m/z through a pumping region to an analyzer. To accomplish this, a multitude of electrodes is used to for the ion guide. The ion guide is "driven" by a complex RF potential consisting of at least two frequency components. The potential is applied between the electrodes of the multipole in such a way that a low frequency RF field appears only near the boundaries of the multipole whereas a higher frequency field appears throughout the device. The high frequency field forces low m/z ions towards the center of the guide whereas the low frequency component of the field reflects high m/z ions toward the guide's interior, at the boundary of the ion guide.

According to another aspect of the invention, a means is provided to select ions in a narrow bandpass mode. To accomplish this the low frequency component of the RF potential is turned off leaving only the high frequency component. In the preferred embodiment, the high frequency component forms a quadrupolar field. By applying an appropriate DC offset between the electrodes, ions can be selected. Alternatively, ion selection might be accomplished by resonance ejection.

According to yet another aspect of the invention, the use of the multiple frequency multipole for MS/MS experiments. In one embodiment, the multiple frequency multipole according to the present invention is divided into three sections. The first and third section of the multipole are operated in wide bandpass mode. Whereas the second section of multipole is operated in narrow bandpass mode. Ions are collisionally cooled and transmitted by the first section to the second section. In the second section, only ions of a predetermined m/z or narrow m/z range are transmitted. Ions are guided by the second section into the third section. The third section might contain a collision gas such that ions in the third section will collide with the gas. A DC potential might be applied between the second and third section such that ions will be accelerated from the second section into the third section. The kinetic energy thus obtained by the ions might result in collisions with the gas in the third section which result in fragmentation of the ion. Such fragment ions would be mass analyzed by the mass analyzer that, in any case, follows the ion guide.

According to another aspect of the invention, an multipole device wherein analyte ions of a broad m/z range or selected m/z range can be accumulated. A "gate" electrode is placed at the exit of the multipole—i.e. between the multipole and the mass analyzer and a DC potential is applied between the gate and the multipole. The potential applied to the gate is repulsive in order to accumulate ions in the multipole whereas the potential is attractive or neutral in order to pass ions from the multipole to the analyzer.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF A PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment of the present invention.

Figure 1:
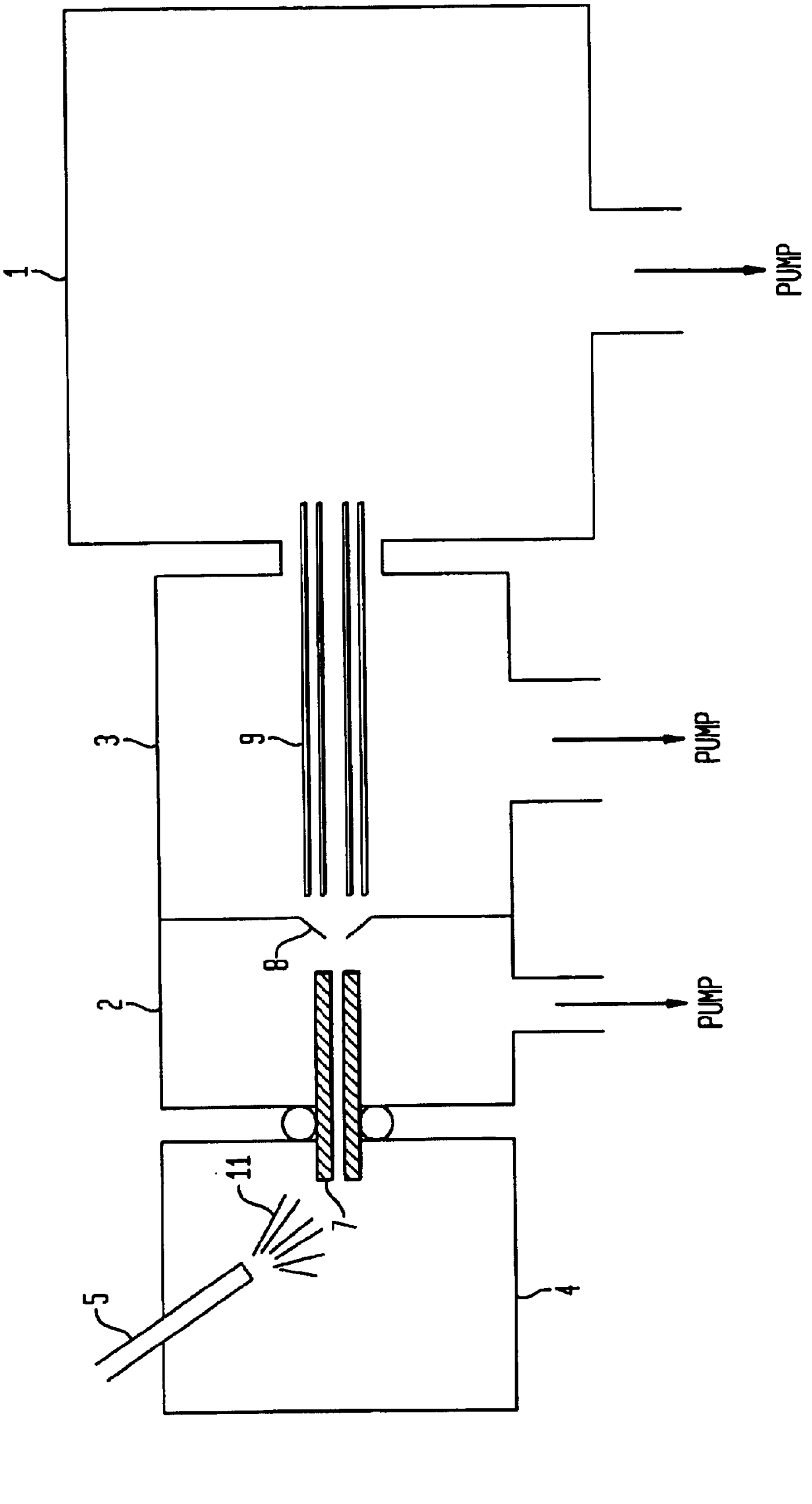
FIG. 1 is a diagram showing the use of API with a mass analyzer.

With regard to FIG. 1, an ESI mass spectrometer is depicted. Ions are produced from sample material in an ionization chamber 4. Sample solution enters the ionization chamber through a spray needle 5, at the end of which the solution is formed into a spray of fine droplets 11. The spray is formed as a result of an electrostatic field applied between the spray needle 5 and a sampling orifice 7. The sampling orifice may be an aperture, capillary, or other similar inlet leading into the vacuum chambers (1, 2 & 3) of the mass spectrometer. Electrosprayed droplets evaporate while in the ionization chamber thereby producing gas phase analyte ions. In addition, heated drying gas may be used to assist the evaporation of the droplets. Some of the analyte ions are carried with the gas from the ionization chamber 4 through the sampling orifice 7 and into the vacuum system (comprising vacuum chambers 1, 2 & 3) of the mass spectrometer. With the assistance of electrostatic lenses and/or RF driven ion guides 9, ions pass through a differential pumping system (which includes vacuum chambers 1, 2 & 3 and lens/skimmer 8) before entering the high vacuum region 1 wherein the mass analyzer (not shown) resides. Once in the mass analyzer, the ions are mass analyzed to produce a mass spectrum.

Figure 2:
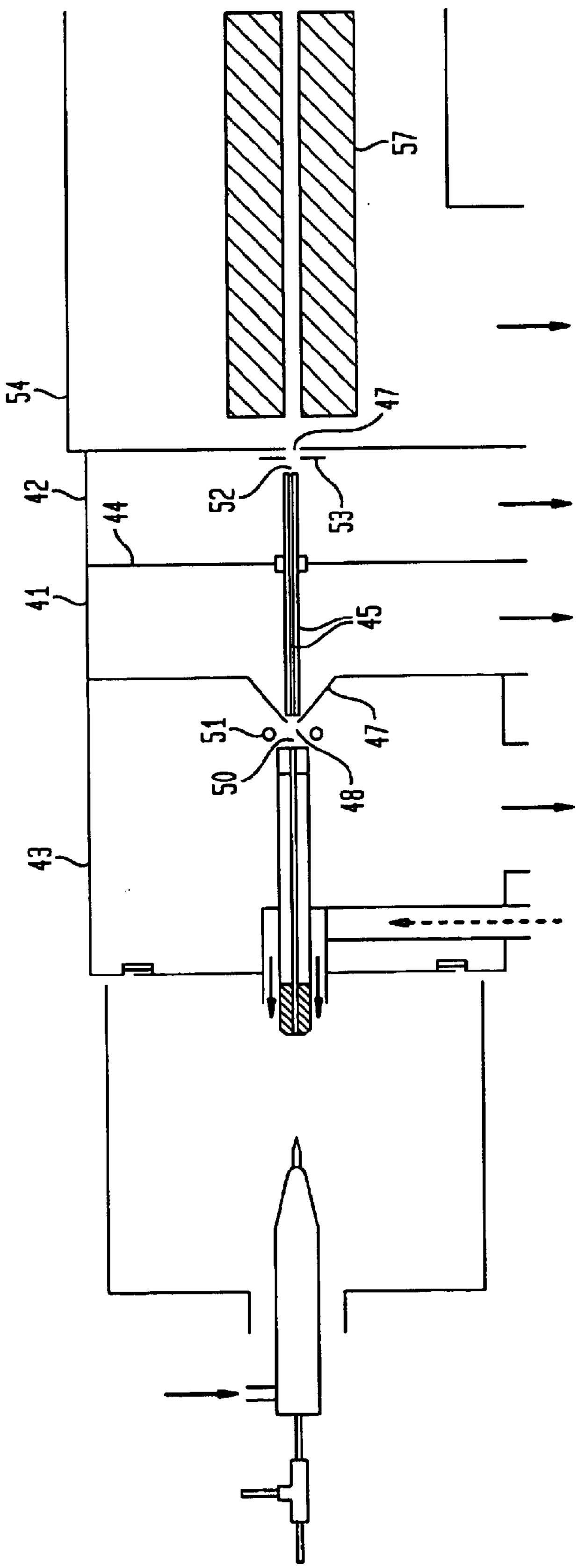
FIG. 2 (PRIOR ART)
FIG. 2 shows a prior art electrospray source according to Whitehouse et al.

Turning next to FIG. 2, depicted is a prior art source design according to Whitehouse et al. As discussed above with respect to FIG. 1, ions are formed from sample solution by an electrospray process when a potential is applied between sprayer 5 and sampling orifice 7. According to this prior art design shown in FIG. 2, a capillary is used to transport ions from the atmospheric pressure where the ions are formed to a first pumping region 43. Lenses 47, 51, and 53 are used to guide the ions from the exit of the capillary 50 to the mass analyzer 57 in the mass analysis region 54—in this case a quadrupole mass analyzer. Between lenses 47 and 53, an RF only hexapole ion guide 45 is used to guide ions through differential pumping stages 41 and 42 to exit 52 and into mass analysis region 54 through orifice 47. The hexapole ion guide 45 according to this prior art design is intended to provide for the efficient transport of ions from one location—i.e. the entrance 48 of lens/skimmer 47—to a second location—i.e. exit 52. Further, through collisions with rest gas in the hexapole, ions are cooled to thermal velocities.

Figure 3:
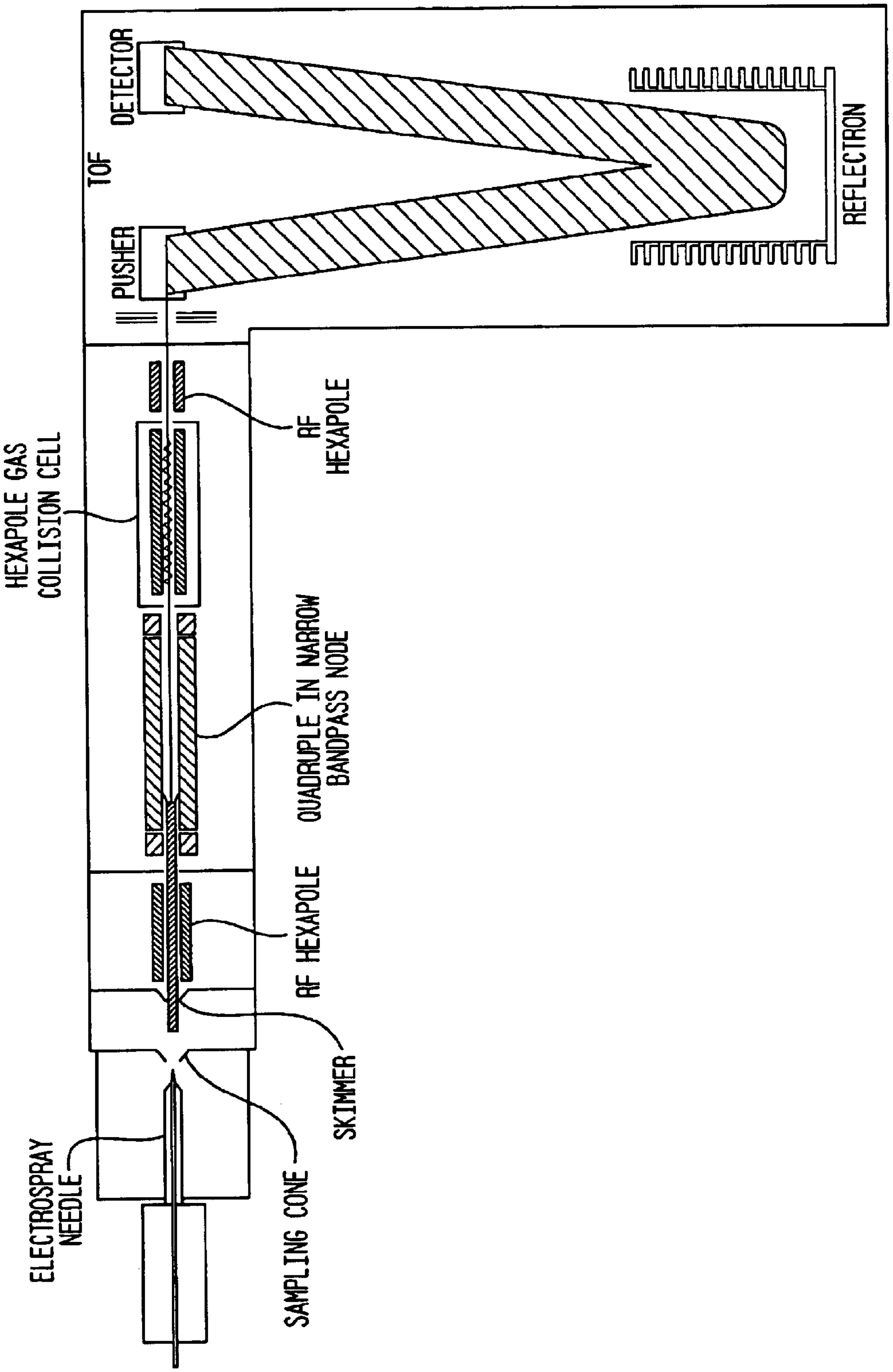
FIG. 3 (PRIOR ART)
FIG. 3 shows a prior art ESI mass spectrometer according to Morris et al.

Next, FIG. 3 depicts a prior art source design according to Morris et al. This prior art design is similar to that of Whitehouse et al., however, the multipole ion guide arrangement is substantially different. In the prior art source design according to Morris et al., four RF multipoles are used. The first multipole encountered by the ions is a hexapole. It is used in a manner similar to the design of Whitehouse et al. to cool and guide the ions. The second multipole encountered is a quadrupole. The quadrupole can be used in a wide bandpass mode, to transmit ions over a broad m/z range, or in a narrow bandpass mode, to transmit ions of a selected narrow m/z range. This leads to the use of the mass spectrometer instrument in MS and MS/MS modes. In MS mode, the quadrupole is operated as a wide bandpass ion guide. Ions are simply transmitted by all four multipoles to the time-of-flight (TOF) mass analyzer. The TOF mass analyzer is then used to produce a mass spectrum. In MS/MS mode, the quadrupole is operated as a narrow bandpass ion guide to select ions of interest. Further, the third multipole—a hexapole—is operated with a DC offset with respect to the quadrupole and is filled with a collision gas. This leads to collisions between the ions of interest and the collision gas and can result in the formation of fragment ions. The fragment ions are guided by yet another hexapole to the TOF analyzer which is then used to produce a mass spectrum of these fragment ions.

The concept essential to the multiple frequency multipole according to the present invention is that the geometry of the electrodes and the RF potentials applied should be such that ions experience different RF electric fields depending on the position of the ion within the device. As a result, ions will respond differently to the field depending on their positions within the multipole. Specifically, ions near the center of the device should experience only a high frequency RF field. However, ions near the electrodes will experience both the high frequency and low frequency RF portions of the field. As a result, low m/z ions can be force toward the center of the multipole by the high frequency portion of the field whereas high m/z ions can be reflected toward the center of the multipole by the low frequency portion of the field.

Figure 4B:
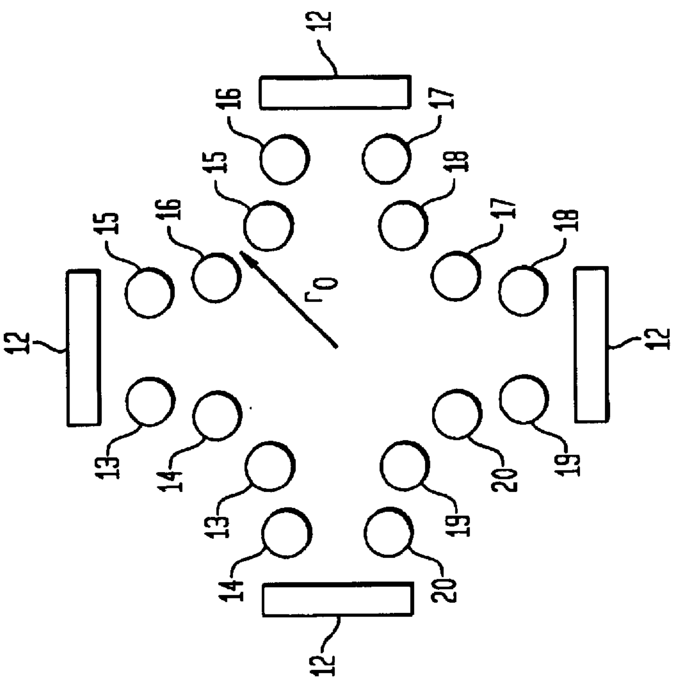
FIG. 4*b* is an end or cross-sectional view of the multiple frequency multipole device shown in FIG. 4*a;*
Figure 4A:
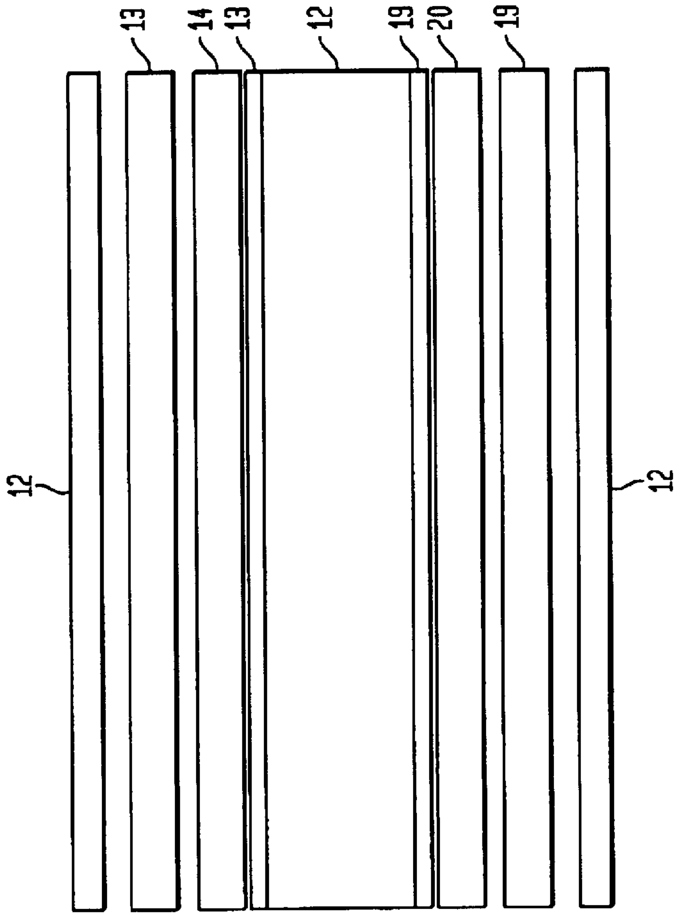
FIG. 4*a* is a side view of a preferred embodiment of the multiple frequency multipole device in accordance with the present invention.

This geometry is plainly depicted in FIGS. 4*a*–*b*. FIG. 4*a* depicts the side view of one embodiment of the multiple frequency multipole according to the present invention, while FIG. 4*b* depicts the same embodiment from an end or cross-sectional view. Elements 13–20 are conducting rods having radius $r_1$ arranged so that they lie parallel to one another. The centers of rods 13–20 are equally spaced along imaginary hyperbole which have a closest approach to the center of the multipole at a distance of $r_0$. Rods 13 and 14 lie along a single hyperbole. Similarly, rods 15 and 16, rods 17 and 18, and rods 19 and 20 each lie along single hyperbole resulting in a four fold symmetry about the axis of the multipole device. Each of these four sets of rods may be seen as an imaginary or virtual pole in a quadruple device. That is, rods 13 and 14 together form one virtual pole 84, rods 15 and 16 form an adjacent virtual pole 85, rods 17 and 18 form virtual pole 86 and rods 19 and 20 form virtual pole 87, all in a virtual quadrupole, as shown by equipotential lines 21 in FIG. 5.

The virtual quadrupole can be driven by the same RF and DC potentials as would be used with a conventional quadrupole. To accomplish this, the virtual poles 84 & 86 represented by rods 13, 14, 17, and 18 might be driven by a sinusoidal RF potential, while virtual poles 85 & 87 represented by rods 15, 16, 19, and 20 would be driven by the identical potential but 180° out of phase. To accomplish broad bandpass transmission, the rods 13–20 would be driven so that there is no DC offset between the two sets of poles. To accomplish narrow bandpass operation, the rods 13–20 would be driven with a DC offset between the two sets of poles.

To provide improved transmission in broad bandpass mode, a second sinusoidal RF potential is applied between rods 13 & 14, rods 15 & 16, rods 17 & 18, and rods 19 & 20. This second sinusoidal RF potential is of a lower frequency than the first RF potential. As a result, high m/z ions will be more responsive to this second RF potential than to the first. Thus, though high m/z ions might not be influenced by the field formed by the first RF potential, they will be repelled by the field formed by the second RF potential. However, the field produced by the second RF potential does not penetrate as far into the interior of the multipole as the first RF field because the rods 13–20 are relatively small and each pair (i.e., rods 13 & 14, rods 15 & 16, rods 17 & 18, and rods 19 & 20) are close together, and the potentials on the rods 13–20 due to the second RF are of opposite polarity. The potentials on the rods 13–20 therefore cancel each other out a short distance from the surface of the virtual pole.

To state this in a more quantitative way, the potential applied between rods 13 and 14 is of the form:

$$U_m = U_{mo}\sin(\omega_1 t) + 2DC_m \tag{1}$$

where $U_{mo}$ is the amplitude of the potential and $\omega_1$ is the frequency of the RF. Similarly, the potential applied between the virtual poles can be given by:

$$U_q = U_{qo}\sin(\omega_2 t) + 2DC_q \tag{2}$$

where $U_{qo}$ is the amplitude of the potential and $\omega_2$ is the frequency of the RF. This leads to four types of poles having different phase angles and DC offsets with respect to the DC level of the multipole as a whole:

$$V_1 = U_{mo}\sin(\omega_1 t) + U_{qo}\sin(\omega_2) + DC_m + DC_q \tag{3a}$$

$$V_2 = U_{mo}\sin(\omega_1 t) + U_{qo}\sin(\omega_2 + \pi) + DC_m - DC_q \tag{3b}$$

$$V_3 = U_{mo}\sin(\omega_1 t + \pi) + U_{qo}\sin(\omega_2) - DC_m + DC_q \tag{3c}$$

and $$V_4 = U_{mo}\sin(\omega_1 t + \pi) + U_{qo}\sin(\omega_2 + \pi) - DC_m - DC_q \tag{3d}$$

The potential $V_1$ would be applied, for example, to rods 13 whereas potential $V_3$ would be applied to rods 14. It is advantageous to apply potential $V_2$ to rods 15 rather than 16 in that the "$U_m$ portion" of the potentials on rods 13 and 15 would be in phase. This would minimize the potential difference between rods 13 and 15 and between rods 14 and 16 and thereby reduce the chance of arcs. Rods 16 then would have the potential $V_4$. Continuing in this manner, potentials $V_1$, $V_2$, $V_3$, and $V_4$ would be applied to rods 18, 19, 17, and 20, respectively.

In space, the quadrupolar potential function, Φ, is given by:

$$\Phi_q = U_q(x^2 - y^2)/r_0^2 \quad (4)$$

where x and y represent positions on a Cartesian coordinate system originating on the axis of the multipole. Equation 4 represents approximately the form of the first RF field discussed above. The dipolar field formed between adjacent electrodes by the second RF potential would take the form:

$$\Phi_m \alpha \ln(d/(d^2+l^2)^{1/2}) \quad (5)$$

where l is the distance between adjacent electrodes, and d is the distance between the electrodes and the point at which the potential is measured. Assuming $r_0$ is much larger than 1, it is clear from an examination of equations 4 and 5, that the potential $\Phi_m$ falls off much more rapidly as a function of distance from the electrodes than does $\Phi_q$.

Figure 5:
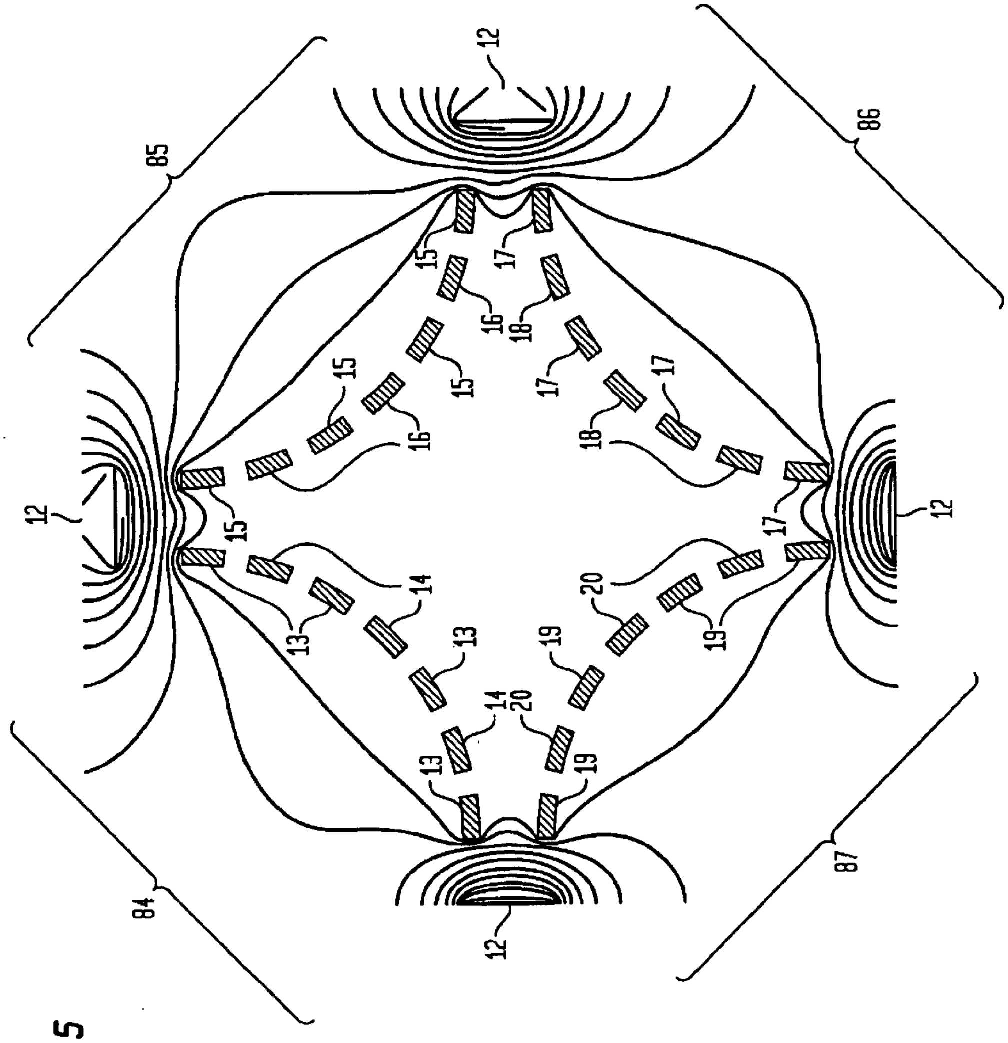
FIG. 5 is a cross-sectional view of an alternate embodiment of the multiple frequency multipole device according to the present invention, depicting the DC equipotential lines between the DC poles and the RF/DC poles when the device is operated in wide bandpass mode.

Because the influence of the field on high m/z ions is limited to the region near the poles, it would be possible for ions to escape the multipole through the gap between adjacent virtual poles. However, in the device according to the present invention, DC electrodes, 12, are placed near the gap. A DC potential is applied between electrodes 12 and electrodes 13–20 such that ions of the desired polarity are repelled back into the multipole. This is illustrated by the calculation of FIG. 5. Here, the RF electrodes are formed as rods with rectangular cross section. A DC potential difference of 30 V is applied between the DC electrodes and the RF electrodes. The equipotential lines of the resulting field are shown. This field would repel positively charged ions back into the multipole. However, notice that the field does not penetrate strongly into the interior of the multipole. At the center of the multipole, the potential due to the DC electrodes is about 60 mV.

Figure 6:
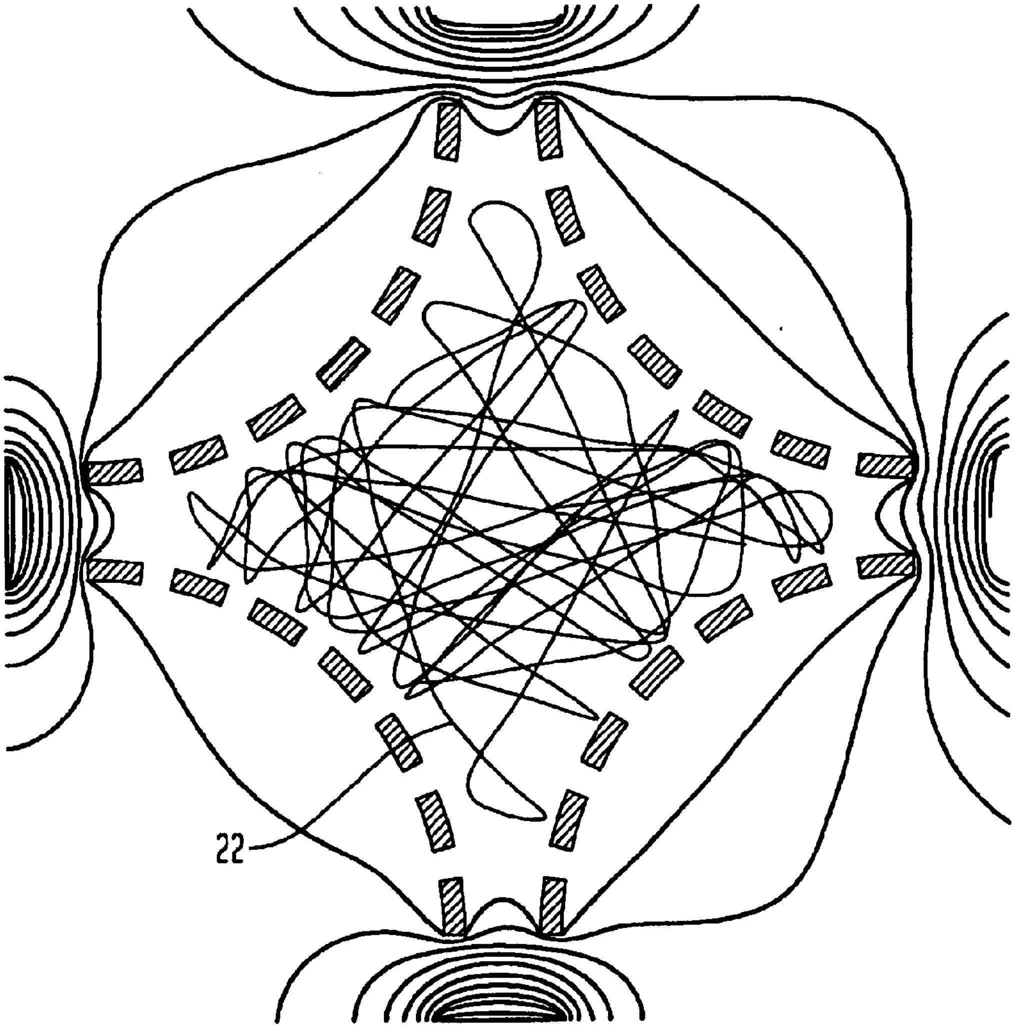
FIG. 6 shows the multiple frequency multipole device shown in FIG. 5, depicting a simulated trajectory of a 100,000 Da/q ion.
Figure 7:
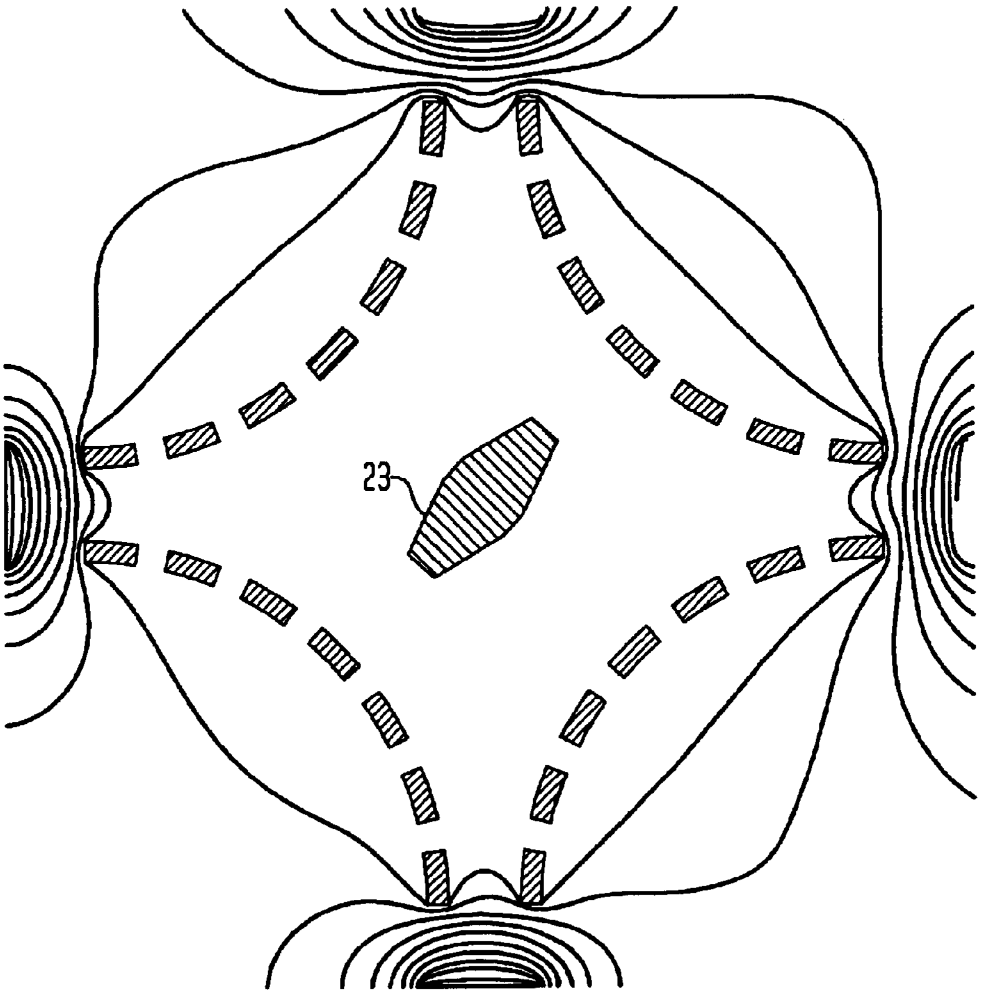
FIG. 7 shows the multiple frequency multipole device shown in FIG. 5, depicting a simulated trajectory of a 100 Da/q ion under the same conditions as the trajectory shown in FIG. 6.
Figure 8:
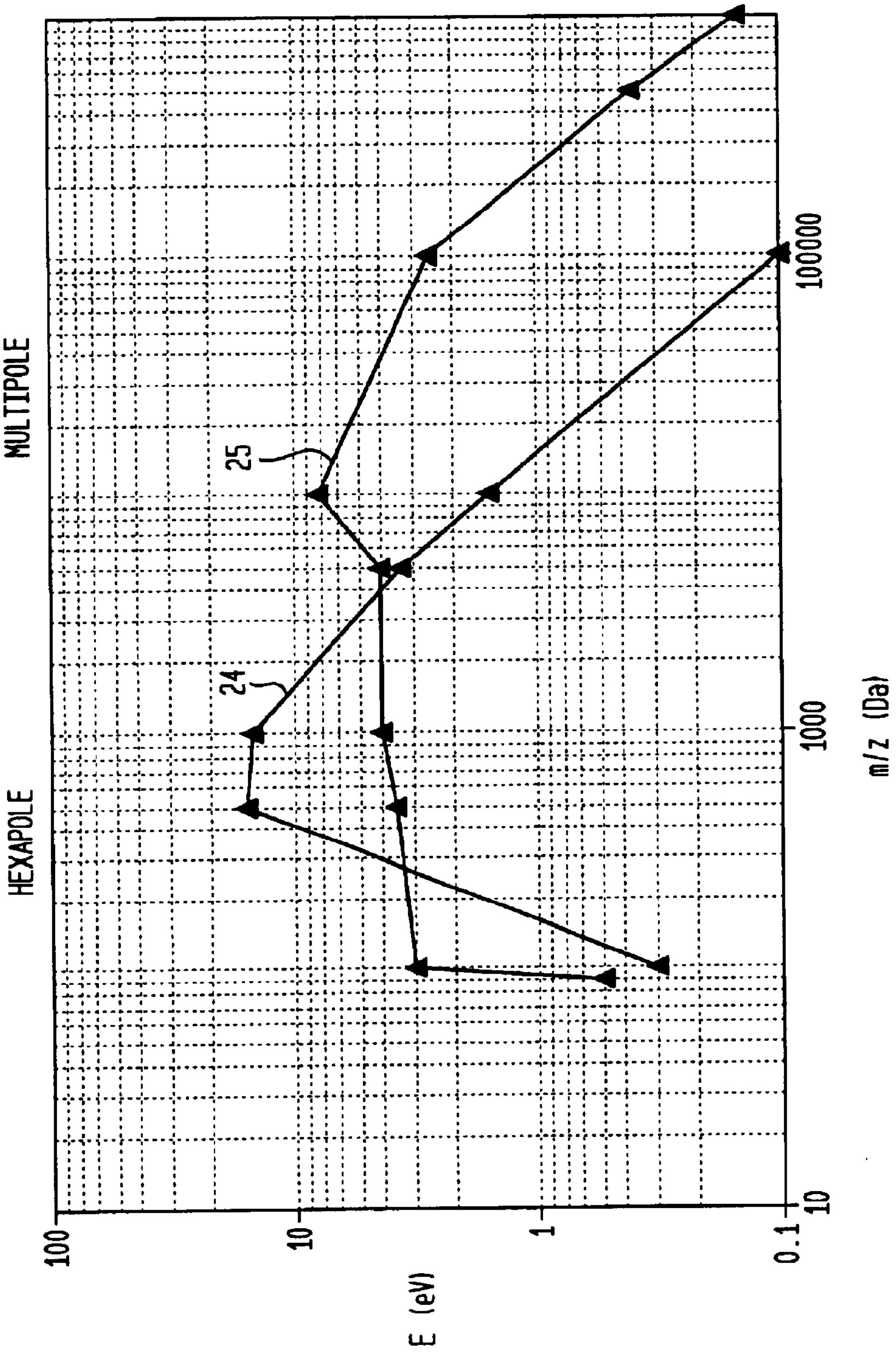
FIG. 8 shows a plot of the maximum radial kinetic energy (E) of transmitted ions versus ion mass-to-charge ratio (m/z) when using a multiple frequency multipole device in accordance with the design depicted in FIGS. 5–7.

In the embodiment depicted in FIGS. 5–7, the rods are assumed to be 0.25 by 0.1 mm in cross section. In this embodiment, the virtual poles are circular rather than hyperbolic. The radius of the virtual poles is 2 mm and the gap between the poles is 0.5 mm. The potential applied between the rods in the simulation of FIG. 6—i.e. $U_m$—is a 2 MHz sinusoidal RF potential of 600 Vpp amplitude. The potential applied between the virtual poles in this simulation—i.e. $U_q$—is 1000 Vpp in amplitude at a frequency of 6.67 MHz. High m/z ions are repelled by the field thus generated near the poles. In the simulation depicted in FIG. 6, 2 eV ions of m/z=100,000 Da/q are transmitted through the device. The simulated ion trajectory 22 is also shown. Under the same conditions, low m/z ions are forced to the center of the multipole by the quadrupolar field. In the simulation depicted in FIG. 7, 4 eV ions of m/z=100 Da/q are transmitted. Again, the simulated ion trajectory 23 is also shown Notice again that the conditions for operating the device are the same for FIGS. 6 and 7. Thus, 4 eV, 100 Da/q ions can be transmitted simultaneous with 2 eV, 100,000 Da/q ions. FIG. 8 plots the highest kinetic energy ion that can be transmitted as a function of m/z for a prior art hexapole device 24 and the multipole device 25 according to the present invention under the conditions discussed with respect to FIGS. 6 and 7. As shown, the prior art hexapole operating at 600 Vpp and 5 MHZ has a much narrower range over which ions of significant energy can be transmitted. For example, considering a lower energy limit of 1 eV, the hexapole would have a range of a factor of 100 (i.e. ~20,000 Da/q/200 Da/q) whereas the multiple frequency multipole device according to the present invention would have a transmission range of 3,000 (i.e. ~300,000 Da/q/100 Da/q).

Figure 9:
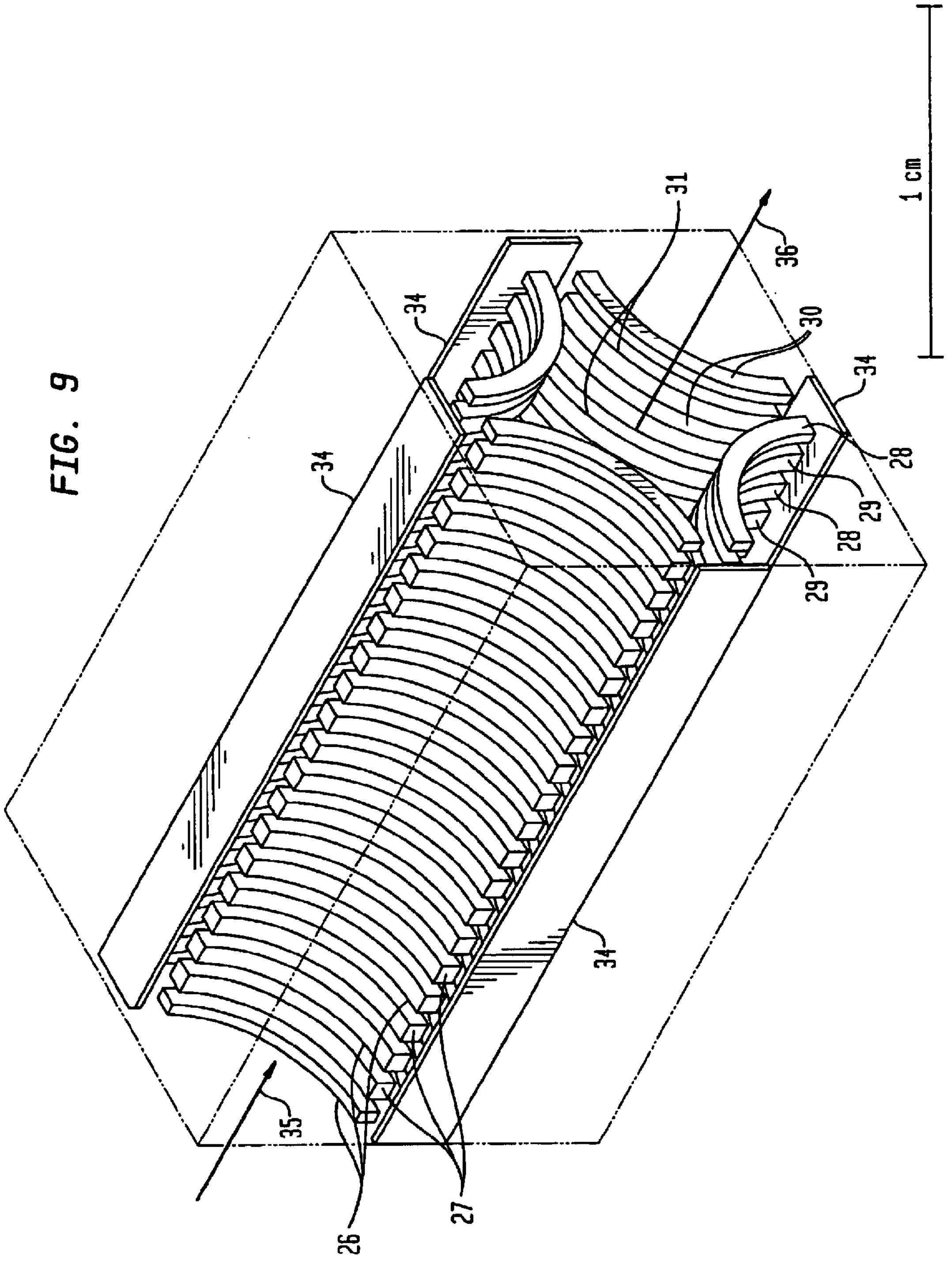
FIG. 9 is a perspective view of the electrode arrangement of an alternate embodiment of a multiple frequency multipole device according to the present invention.

FIGS. 9 and 10 depict an alternate embodiment of the multiple frequency multipole wherein RF electrodes 26–33 take the form of arcs which reside in a plane perpendicular to the major axis of the multipole. In a manner similar as discussed above, the potential $U_m$ is applied between electrodes 26 and 27, 28 and 29, 30 and 31, and 32 and 33. The potential $U_q$ is applied between electrodes 26, 27, 30, and 31 and electrodes 28, 29, 32, and 33. A DC potential is applied between electrodes 34 and 26–33. Ions enter the multipole at one end of the device 35, travel substantially along the axis of the multipole and exit at the opposite end of the multipole 36.

Figure 10B:
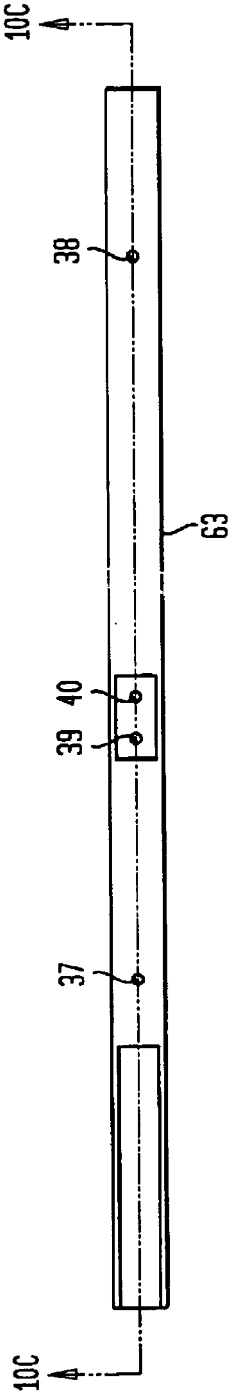
FIG. 10*b* is a side view depiction of an insulating support rod for the electrodes of the multiple frequency multipole shown in FIG. 9.
Figure 10C:
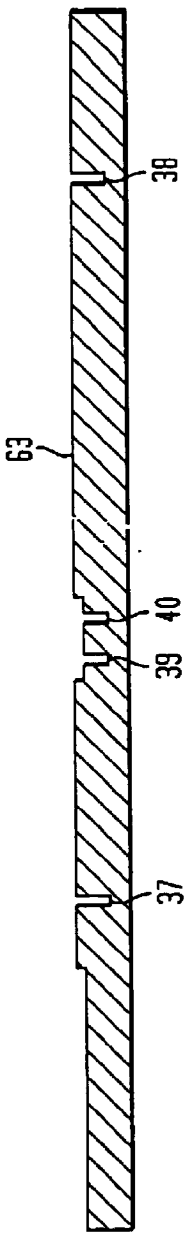
FIG. 10*c* is a lengthwise cross-sectional view depiction of an insulating support rod for the electrodes of the multiple frequency multipole shown in FIG. 9.
Figure 10A:
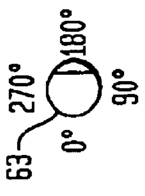
FIG. 10*a* is an end view depiction of an insulating support rod for the electrodes of the multiple frequency multipole shown in FIG. 9.
Figure 10D:
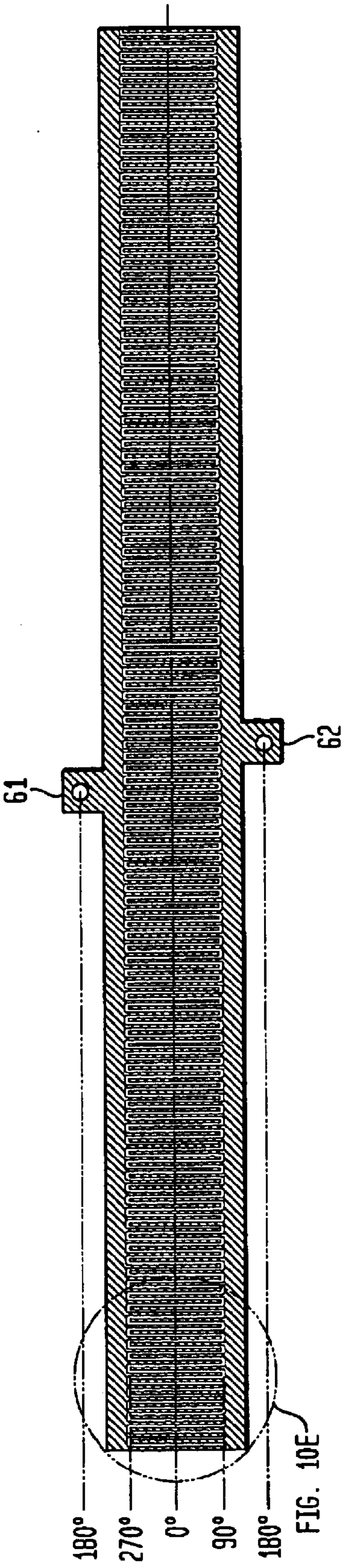
FIG. 10*d* shows the flat pattern of the electrode shown in FIG. 9.
Figure 10E:
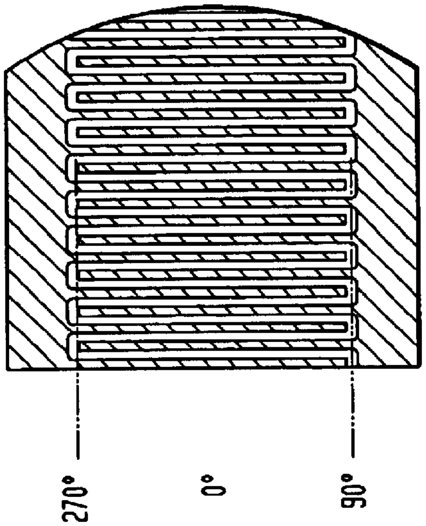
FIG. 10*e* is an expanded view of section Z of the electrode pattern shown in FIG. 10*d;*

That the electrodes 26–33 lie in a plane perpendicular to the axis of the multipole has certain practical advantages in construction and operation. Specifically, one set of electrodes (e.g. electrodes 26 and 27) together with an insulating support might be constructed as a single component. Such a component is depicted in FIG. 10. FIG. 10 depicts an end view (FIG. 10*a*), a side view (FIG. 10*b*), and a cross-sectional view (FIG. 10*c*) of an insulating support rod, and the pattern of the conductor which is placed on the support rod (FIGS. 10*d–e*). In this embodiment, the rod is about 5 mm in diameter. For reference, angles around the axis of the rod are shown with 0° located at the position on the rod which in the final assembly will be closest to the center of the multipole. Four holes are tapped in the rod at 180° (i.e. opposite the center of the multipole). Two of these holes 37 and 38 are intended for mounting the rod in the multipole assembly. The other two holes, 39 and 40, are used for making electrical contact with the multipole electrodes. The electrodes are formed by vapor depositing conducting material (e.g. gold) on the rod and then removing conductor to generate the pattern depicted in FIGS. 10*d–e*. This pattern might be produced by etching or machining. Machining has the advantage that grooves can be made in the insulator between the electrodes at the same time as conductor is removed and the electrode pattern is formed. Such grooves separating the electrodes will tend to make arcing between the electrodes less likely because the distance between the electrodes along the surface of the insulating support would be greater. In the embodiment depicted, the distance between the electrodes is 0.3 mm and the depth of the groove is 0.3 mm. This leads to a total distance between the electrodes along the surface of the insulator of 0.9 mm. In contrast, etching the conductor to generate such a pattern would lead to a 0.3 mm gap along the surface of the insulator. Any other method of producing the electrode pattern shown in FIG. 10—for example, masked vapor deposition—might be used. Notice in FIG. 10*d* that holes 61 and 62 in the electrode pattern coincide with threaded holes 39 and 40 respectively in the rod. A wire with a spade or ring contact can thus be readily connected to an electrode by screwing it to the rod via hole 39 or 40.

Figure 11:
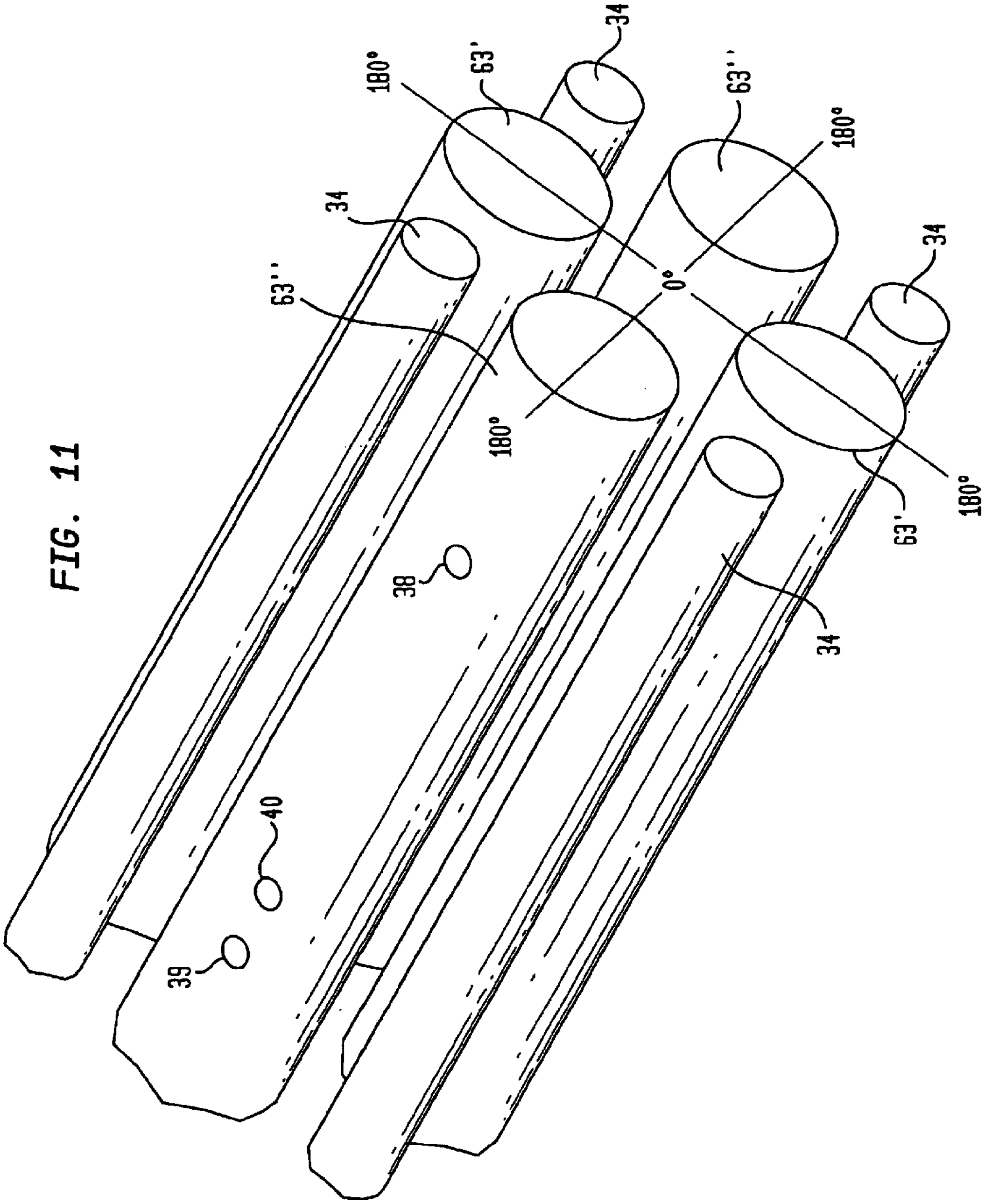
FIG. 11 is a perspective view of a multiple frequency multipole assembly in accordance with the present invention, including the rods and electrodes of FIGS. 9 and 10.

Four such rods, 63, are assembled into a multipole according to the present invention as shown in FIG. 11. Notice again that the poles are oriented with the 180° line, as referenced in FIG. 10, opposite the center of the multipole. The 0° line and therefore the electrodes on rods 63 face the center of the multipole. Also, tapped holes 37 and 38 are used to support rods 63 in the multipole assembly and holes 39 and 40 are used to make electrical contact with the electrodes. It is interesting to note that rods 63 as assembled into the multipole embodiment of FIG. 11 form a quadrupole. If contacts 61 and 62 are shorted together, then the structure and performance of the device would be virtually identical to that of a prior art quadrupole. Finally, notice the presence of conducting rods 34. Rods 34 are made of rigid, electrically conducting material such as stainless steel and perform the function of the DC electrodes as described above.

Figure 12:
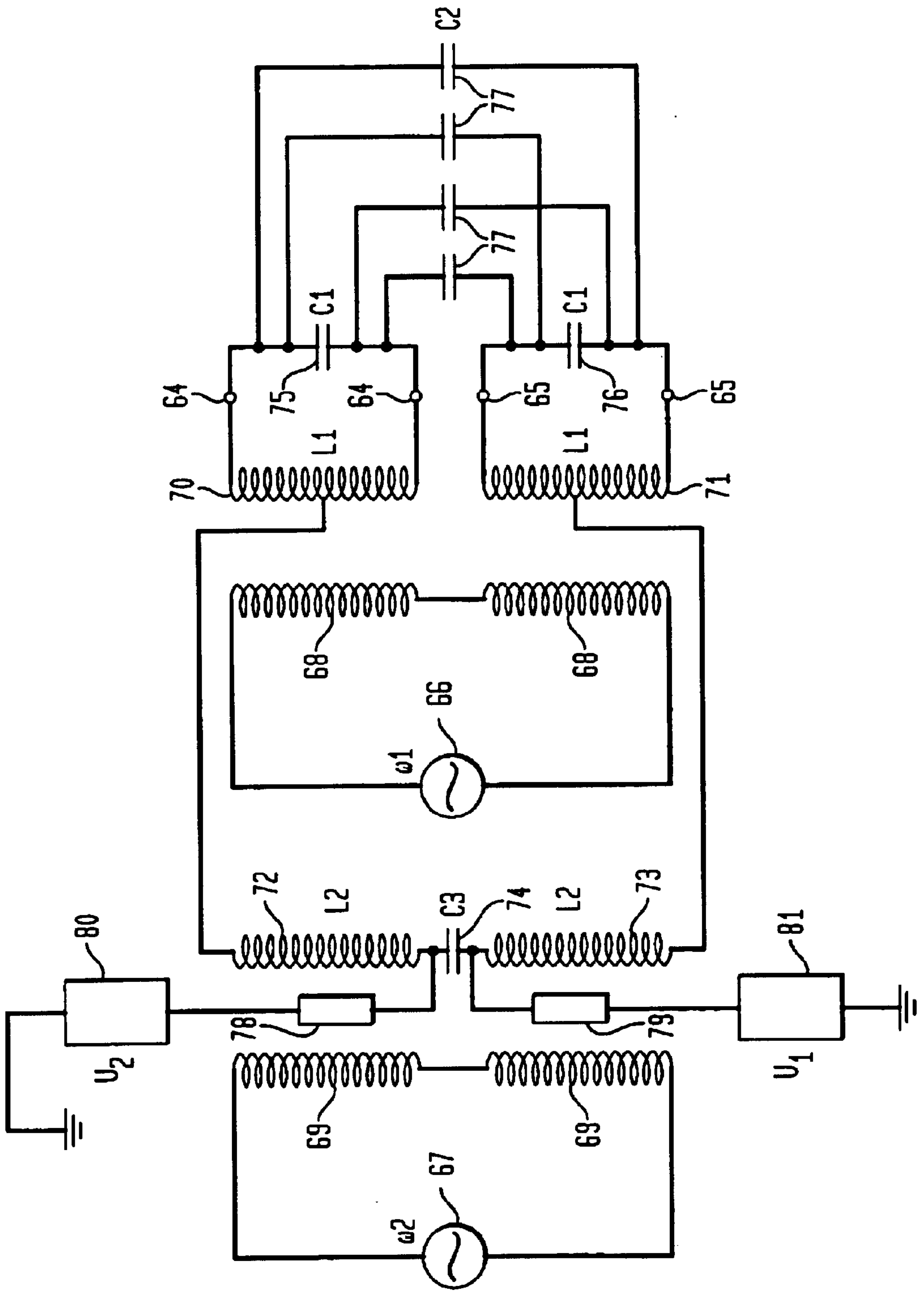
FIG. 12 shows a schematic diagram of a preferred embodiment of the electrical circuit for use to drive the multiple frequency multipole in wide bandpass mode.

One possible means of producing the RF potentials for the multiple frequency multipole is shown in FIG. 12. Here, oscillators 66 and 67 drive primary coils 68 and 69 respectively. Primary coil 68 is inductively coupled to secondary coils 70 and 71. The leads of coils 70 and 71 are connected as outputs through connectors 64 and 65 to connections 61 and 62 on rods 63' and 63". Capacitors 75 represent the capacitance between the electrodes on rods 63'—i.e. between electrodes 26 and 27 and between electrodes 30 and 31. Capacitor 76 similarly represents the capacitance between electrodes on rods 63"—i.e. between electrodes 28 and 29 and electrodes 32 and 33. Capacitors 77 represent the capacitance between the electrodes of rods 63' and 63"—i.e. between electrodes 26, 27, 30, and 31 and electrodes 28, 29, 32, and 33.

Secondary coil 70, having inductance L1, and capacitors 75 and 77, having capacitance C1+C2, form an LC circuit having a resonant frequency $\omega_1$. Similarly, secondary coil 70 and capacitors 76 and 77 form a second LC circuit having the same inductance, capacitance, and resonant frequency ω1. Primary coil 68 has the same inductive coupling with secondary coil 70 as with secondary coil 71, therefore, the amplification provided by the transformer formed by coils 68 and 70 is the same as that provided by the transformer formed by coils 68 and 71. The potential across capacitor 75 must therefore be the same as that across capacitor 76. That is, as provided by the circuit of FIG. 12, the frequency and amplitude of the potential between electrodes 26 and 27 and between electrodes 28 and 29 and between electrodes 30 and 31 and between electrodes 32 and 33 are all the same.

Primary coil 69 is inductively coupled to secondary coils 72 and 73. Secondary coils 72 and 73 are AC coupled through capacitor 74. The capacitance C3 of capacitor 74 is much greater than that of capacitors 77—i.e. 4×C2. The terminal of coil 72 is connected to the center tap of coil 70 whereas the terminal of coil 73 is connected to the center tap of coil 71. Through coils 70 and 71, coils 72 and 73 are connected to capacitors 77. Coils 72 and 73 and capacitors 77 form an LC circuit having inductance 2×L2, a capacitance 4×C2, and a resonant frequency $\omega_2$. Coil 69 has the same inductive coupling with coil 72 as with 73. As a result, the potential across coil 72 will be always the same as the potential across coil 73. The DC level of the multipole with respect to the ground and the DC potential difference between poles 63' and 63" is provided by DC power supplies 80 and 81 through resistors 78 and 79. The potential difference between poles 63' and 63" is given by $V_1-V_2$ whereas the potential level of the multipole with respect to ground is given by $(V_1+V_2)/2$.

To operate the multipole in wide bandpass mode, $V_1-V_2$ is set to zero volts and potentials such as discussed with respect to FIGS. 6–8 are applied to the electrodes—e.g. a potential $U_m$ of 600 Vpp at 2 MHZ and $U_q$ of 1000 Vpp at 6.67 MHZ. To narrow bandpass mode, oscillator 66 is turned off so that only a quadrupolar field is left in the multipole. Also the potential $V_1-V_2$ is set to a non-zero potential. The potential difference $V_1-V_2$, the frequency $\omega_2$ and the amplitude of the RF potential between poles 63' and 63" will determine the m/z of the ions which are passed. The proper values of the potentials and frequencies for the selection of any given m/z can be determined as described by Peter Dawson et al. in *Quadrupole Mass Spectrometry and its Applications*, Peter Dawson ed., AIP Press, Woodbury, N.Y., c1995.

Figure 13:
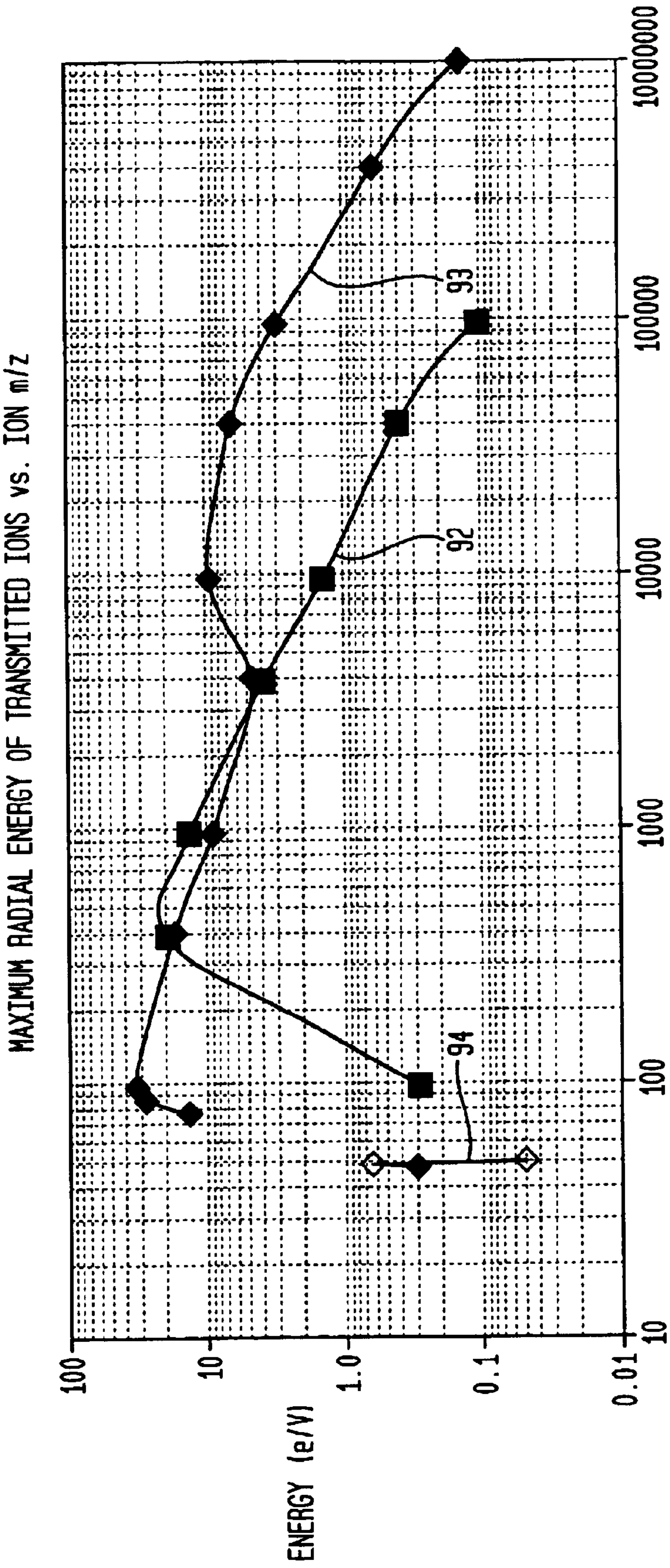
FIG. 13 is a plot of the maximum radial energy of transmitted ions vs. ion m/z for the multiple frequency multipole device according to the present invention in both wide bandpass mode and narrow bandpass mode.

In narrow bandpass mode, it may be advantageous to drive the multipole off resonance. FIG. 13 plots the maximum radial kinetic energy of transmitted ions vs. ion m/z for a prior art, RF only hexapole as described by Whitehouse et al. 92, a multiple frequency multipole according to the present invention operated in broad band pass mode 93, and a multiple frequency multipole according to the present invention operated in a narrow bandpass mode 94. In narrow bandpass mode, the multiple frequency multipole was operated at 5 MHZ, 1 kVpp, and 160 V DC offset between poles 63' and 63". Clearly, in broad bandpass mode the multiple frequency multipole provides a much broader m/z transmission range than the prior art hexapole, whereas in narrow bandpass mode the multiple frequency multipole provides a much narrower m/z transmission range than the prior art hexapole.

Figure 14:
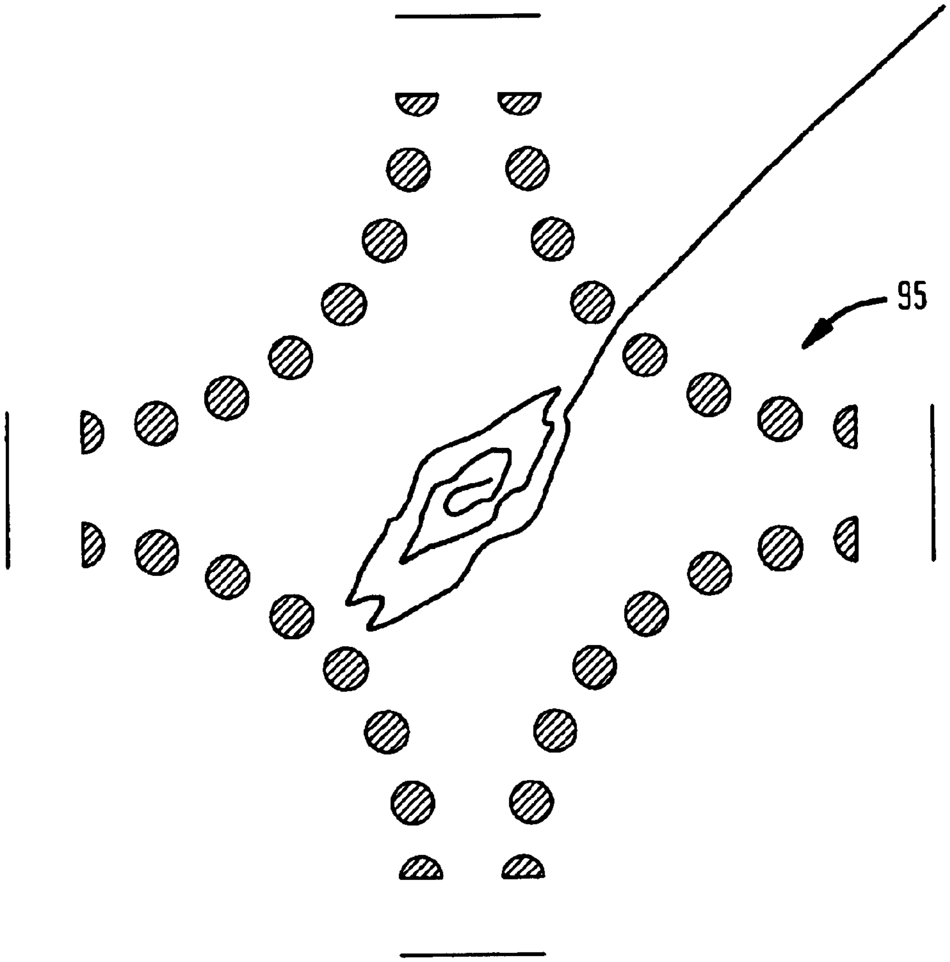
FIG. 14 is a cross-sectional view of an embodiment of the multiple frequency multipole device according to the invention, depicting a simulated resonance ejection of a 100 Da/q ion from the multiple frequency multipole device.

Ions might also be selected via resonance ejecetion as depicted in the simulation 95 of FIG. 14. To accomplish this oscillator 66 was turned off and an additional relatively low amplitude RF potential was applied via oscillator 67. The frequency of the additional RF was chosen to be the resonant frequency of motion of a 100 Da/q ion in a 1000 Vpp, 5 MHZ, quadrupolar field. In this case the amplitude of the resonant potential was 100 Vpp and its frequency was 1.37 MHZ. The selection of appropriate parameters for resonant ejection can be accomplished as described in *Quadrupole Mass Spectrometry and its Applications*, Peter Dawson ed., AIP Press, Woodbury, N.Y., c1995. Further, it is possible to apply complex wave forms for isolation of selected ions via resonant ejection of all unwanted ions.

A multitude of multipoles may be used in series, for example as described by Morris et al. To accomplish MS/MS analysis of sample ions, first multiple frequency multiple might be used in broad bandpass mode and thereby be used for collisional damping/cooling and transmission over a broader m/z range than possible in the arrangement of Morris et al. A second multiple frequency multipole might be operated in narrow bandpass mode to select ions of a desired m/z. A third multiple frequency multipole might be operated in broad bandpass and filled with collision gas so as to act as a collision cell. A DC potential difference between the second multipole and the third would result in collisions with the collision gas in the third multipole which would lead to fragmentation of the selected ions and thereby fragment ion formation. A fourth multiple frequency multipole might be used to transmit the ions to the mass analyzer. To operate in MS only mode, the second multiple frequency multipole would be operated in broad bandpass mode rather than narrow, the DC level between the second and third multipoles would be reduced (e.g. to zero volts) and the third multipole would be operated without collision gas. Ions are simply cooled and transmitted from the entrance of the first multipole through all four multipoles and to the mass analyzer. The multiple frequency multipole, while providing similar performance in MS/MS mode to that of the prior art design of Morris et al., provides broader m/z ion transmission in MS only mode.

Figure 15:
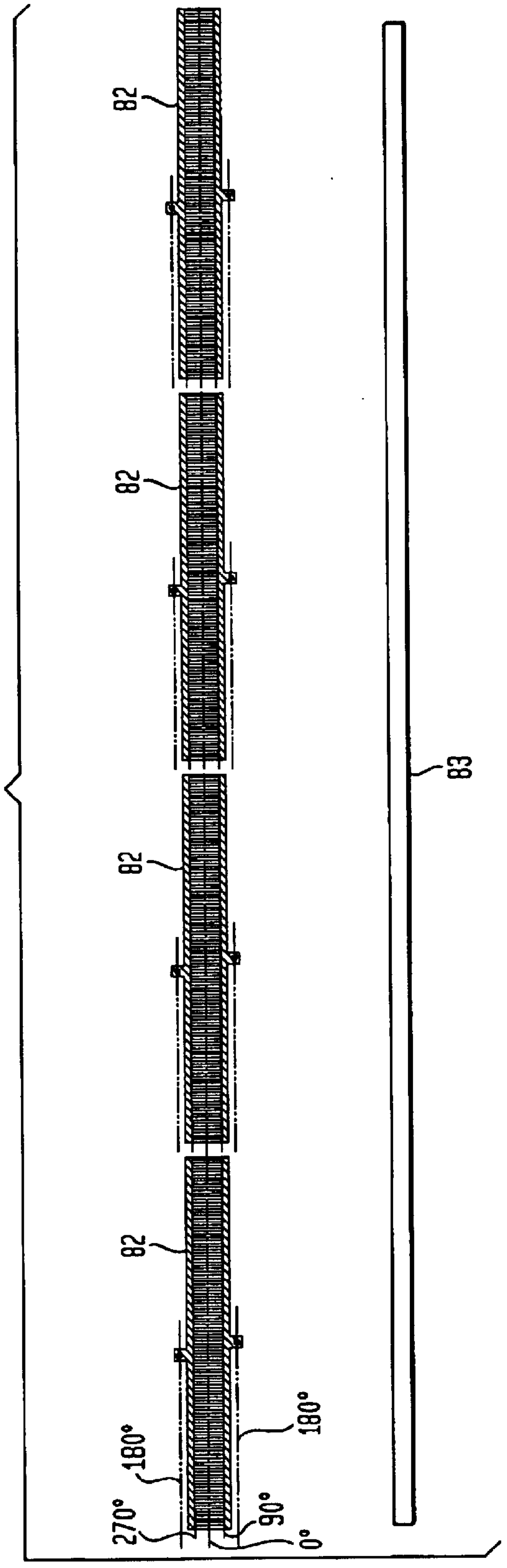
FIG. 15 depicts an alternate embodiment of an insulating support and the electrode pattern placed on it which may be used in the construction of an assembly of four multiple frequency multipoles in series.

As described, a single multiple frequency multipole design is adequate to several tasks—i.e. ion cooling and broad bandwidth transmission through a pressure gradient, narrow bandwidth ion selection, and operation as a broad bandwidth collision cell. Any and all these tasks can be performed by a multiple frequency multipole of a single design—i.e. without any physical modification. Thus, the multiple frequency multipoles described above might be all of the same physical dimensions and design. The construction of such a series of multiple frequency multipoles might be simplified by placing four sets of electrodes 82 in series along the length of a single insulating rod 83 as depicted in FIG. 15 and then assembling four such rods into a single device (as described with respect to FIG. 11). Such a device would consist of only four rods but would have four independent sets of electrodes—each operating as a multiple frequency multipole.

Figure 16:
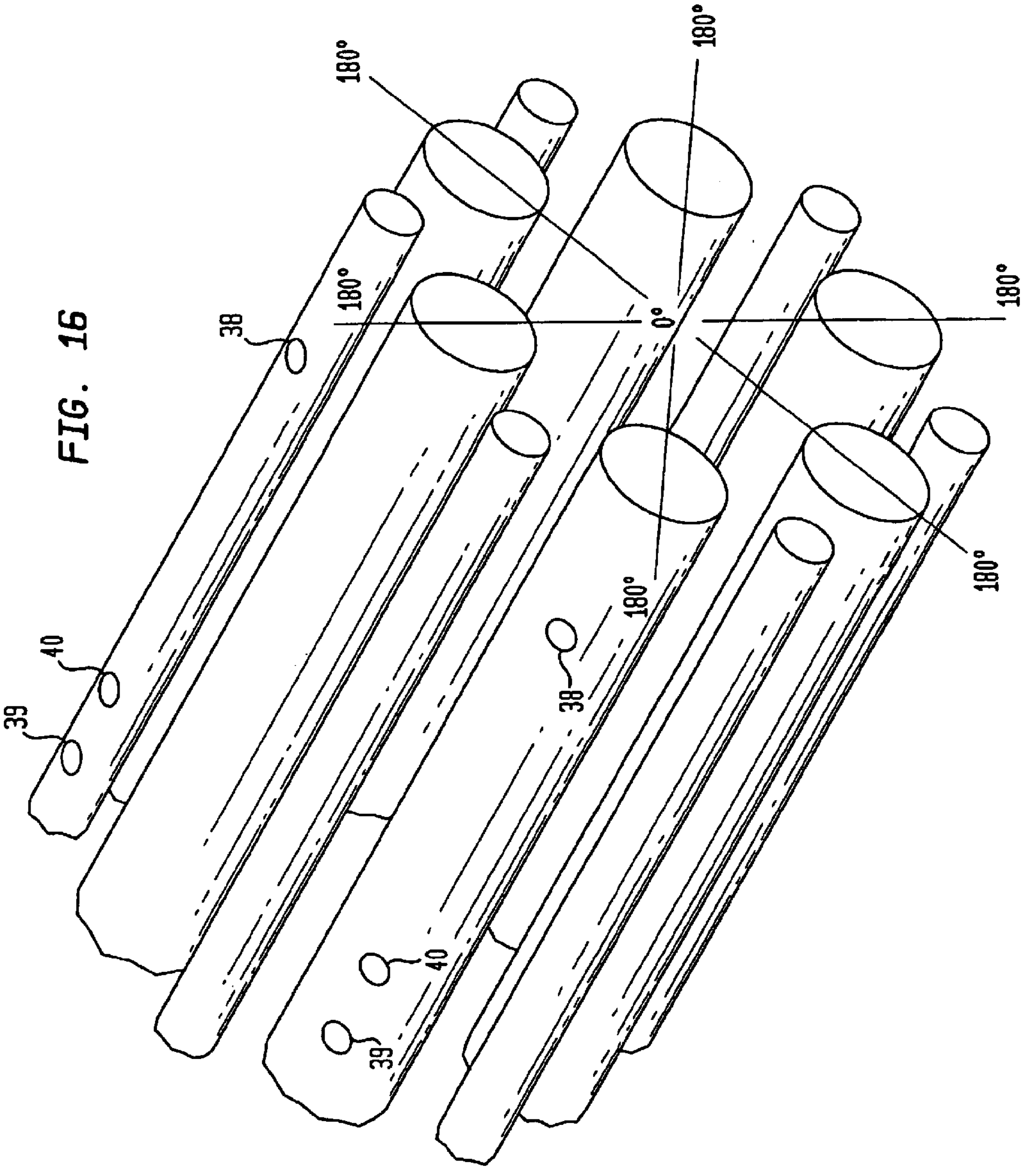
FIG. 16 is a perspective view of an alternate embodiment multiple frequency multipole assembly in accordance with the present invention, which includes six support rods and associated pair of electrodes.

Other alternate embodiment multiple frequency multipoles might include more than four rods. Alternate embodiments might include five, six, eight, or any other number of rods. FIG. 16 depicts an alternate embodiment which includes six electrode bearing rods (63' and 63") and six DC rods 34. Having more rods, will improve the m/z bandwidth in wide bandpass operation, however, a quadrupole arrangement as discussed with respect to FIG. 11 will provide the best ion selection in narrow bandpass mode. Note also that whereas the rods described with respect to FIG. 11 were round, they could be any conceivable shape, including hyperbolic. Further, while the rods described thus far have been straight, they could be bent, and they could be used in a manner similar to that described by Baykut in U.S. Pat. No. 5,825,026.

Other alternate embodiments may includes entrance and/or exit electrodes. Such electrodes would take the form of conducting plates—e.g. stainless steel—with apertures through which ions could pass. One or more entrance electrodes may be placed between an ion source and the entrance of a multiple frequency multipole. Similarly, one or more exit electrodes may be placed between the multiple frequency multipole and subsequent devices. Such electrodes may be used for focusing ions as they enter or exit the multipole. Alternatively, ions may be trapped in a multiple frequency multipole by applying a repulsive potential between the entrance and exit electrodes and the multipole, The use of such electrodes has been described extensively in prior at and in U.S. Pat. No. 5,689,111.

Also, one or more multiple frequency multipoles according to the present invention may be used and operated independent of any other analyzer. That is, a set of multiple frequency multipoles may be used to mass analyze ions, collisionally activate selected ions, mass analyze fragment ions, etc. without reliance on any other mass analyzer.

The same concepts discussed above with respect to linear multiple frequency multipoles can be applied to multipole ion traps. For example, one might make an ion trap of cylindrical geometry similar to that described by Paul and Steinwedel (Z. Naturforsch. 8a, 448 (1953)), a toroidal ion trap or a "race track" shaped trap similar to those described by Drees and Paul (Z. Phys. 180, 340 (1964)) and Church (J. Appl. Phys. 40, 3127 (1969)). The distinction of the traps according to the present invention and prior art is that a multitude of electrodes are used to form virtual poles and that at least two potentials are applied to the electrodes—i.e. one potential between adjacent electrodes and one between virtual poles.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A mass analyzer comprising at least one multiple frequency multipole device, wherein said multipole device is configured such that different potentials are applied to said electrodes so that said ions, experience different electric fields depending on said electrodes geometry and said ions' position within said multipole device.

2. A mass analyzer according to claim 1, wherein said multiple frequency multipole device comprises at least four virtual poles and four DC electrodes.

3. A mass analyzer according to claim 1, wherein said mass analyzer comprises at least three multipole devices, and wherein at least one of said multipole devices is a multiple frequency multipole device.

4. A mass analyzer according to claim 1, wherein each of said multipole devices is a multiple frequency multipole device.

5. A mass analyzer according to claim 4, wherein said multipole devices are arranged in series such that analyte ions pass through each multipole.

6. A mass spectrometer comprising:

an ion source region for producing ions;

an analysis region for analyzing said ions;

at least one multiple frequency multipole device;

a power source for applying different potentials to said multipole device;

an ion guide for guiding ions through a pumping region to said analyzer; and an ion detector for detecting said ions;

wherein said multipole device comprises a plurality of electrodes arranged such that application of said potentials to said electrodes creates a plurality of electric fields within said multipole device such that said ions near the boundaries within said multipole device experience a first electric field and said ions located away from the boundaries within said multipole device experience a second electric field.

7. A mass spectrometer according to claim 6, wherein said multipole device guides at least one of said ions.

8. A mass spectrometer according to claim 6, wherein said multipole device selects at least one of said ions.

9. A mass spectrometer according to claim 6, wherein said multipole device is positioned in said ion source region.

10. A mass spectrometer according to claim 9, wherein said multipole device guides said ions from said ion source region to said analysis region.

11. A mass spectrometer according to claim 9, wherein said multipole device transports said ions having selected m/z ratios from said ion source region to said analysis region.

12. A mass spectrometer according to claim 6, wherein at least three multipole devices are used.

13. A multiple frequency multipole for guiding, trapping, or selecting ions, said multipole comprising a plurality of electrodes configured to form an entrance end, an exit end and a central axis of said multipole, wherein said electrodes are arranged along said axis such that proper application of electric potentials between said electrodes results in an oscillating electric field having at least two frequency components, and wherein lower frequency components of said electric field are substantially confined to regions further from said central axis.

14. A multipole device according to claim 13, wherein said electrodes are curved elements arranged in parallel such that a plurality of hyperbolic configurations are formed.

15. A multipole device according to claim 14, wherein a virtual pole is formed on each said hyperbolic configuration.

16. A multipole device according to claim 13, wherein said electrodes comprise a plurality of rods arranged in a cylindrical configuration.

17. A multipole device according to claim 13, wherein said electrodes comprises a plurality of rods arranged in a rectangular configuration.

18. A multipole device according to claim 13, wherein said electrodes comprises a plurality of rods arranged in a octagonal configuration.

19. A multipole device according to claim 13, wherein said electrodes form virtual poles.

20. A multipole device according to claim 19, wherein said multipole device further comprises DC-only electrodes positioned between said virtual poles.

21. A multipole device according to claim 19, wherein said virtual poles form a virtual quadrupole.

22. A multipole device according to claim 19, wherein said virtual poles form a virtual hexapole.

23. A multipole device according to claim 19, wherein said virtual poles form a virtual pentapole.

24. A multipole device according to claim 19, wherein said virtual poles form a virtual octapole.

25. A multipole device according to claim 13, wherein said electrodes are supported on insulating rods.

26. A multipole device according to claim 25, wherein said electrodes on each said insulating rods form a single virtual pole.

27. A multipole device according to claim 26, wherein four of said insulating rods form a virtual quadrupole.

28. A multipole device according to claim 26, wherein five of said insulating rods form a virtual pentapole.

29. A multipole device according to claim 26, wherein five of said insulating rods form a virtual hexapole.

30. A multipole device according to claim 26, wherein five of said insulating rods form a virtual octapole.

31. A multipole device according to claim 13, wherein said electrodes are aligned in parallel.

32. A multipole device according to claim 31, wherein said electrodes are parallel to said virtual poles.

33. A multipole device according to claim 31, wherein said electrodes are perpendicular to said virtual poles.

34. A multipole device according to claim 13, wherein the distance between adjacent electrodes is less than the distance from the center of said multipole device to the closest said electrodes.

35. A multipole device according to claim 13, wherein said multipole device is used in an ion source.

36. A multipole device according to claim 35, wherein said multipole device is used to guide ions from said ion source through a differential pumping region.

37. A multipole device according to claim 36, wherein said electrodes are arranged to form a plurality of hyperbole.

38. A multipole device according to claim 37, wherein a virtual pole is formed on each said hyperbole by said electrodes.

39. A multipole device according to claim 36, wherein said electrodes form virtual poles.

40. A multipole device according to claim 39, in said multipole device further comprises DC-only electrodes positioned between said virtual poles.

41. A multipole device according to claim 39, wherein said virtual poles form a virtual quadrupole.

42. A multipole device according to claim 39, wherein said virtual poles form a virtual hexapole.

43. A multipole device according to claim 39, wherein said virtual poles form a virtual pentapole.

44. A multipole device according to claim 39, wherein said virtual poles form a virtual octapole.

45. A multipole device according to claim 39, wherein said electrodes are supported on insulating rods.

46. A multipole device according to claim 45, wherein said electrodes on each said insulating rods form a single virtual pole.

47. A multipole device according to claim 46, wherein four of said insulating rods form a virtual quadrupole.

48. A multipole device according to claim 46, wherein five of said insulating rods form a virtual pentapole.

49. A multipole device according to claim 46, wherein six of said insulating rods form a virtual hexapole.

50. A multipole device according to claim 46, wherein eight of said insulating rods form a virtual octapole.

51. A multipole device according to claim 35, wherein said ion source is an electrospray ion source.

52. A multipole device according to claim 35, wherein said ion source is an elevated pressure MALDI ion source.

53. A multipole device according to claim 35, wherein said ion source is an atmospheric presure chemical ionization source.

54. A multipole device according to claim 35, wherein the distance between adjacent electrodes is less than the shortest distance from the center of said multipole device to said electrodes.

55. An apparatus for guiding or selecting ions in a mass spectrometer, wherein said apparatus comprises:

a multiple frequency multipole device comprising a plurality of parallel electrodes arranged to create a plurality of pole forming means; and means for applying electric potentials to said electrodes;

wherein application of said potentials to said electrodes creates virtual poles at each said pole forming means; and wherein said virtual poles provide at least one electric field such that said ions near the boundaries within said multipole device experience a first electric field and said ions away from the boundaries within said multipole device experience a second electric field.

56. An apparatus according to claim 55, wherein said electrodes are curved elements arranged in parallel to form a plurality of hyperbolic configurations.

57. An appratus according to claim 56, wherein a virtual pole is formed on each said hyperbolic configuration.

58. An apparatus according to claim 55, wherein said electrodes comprise a plurality of rods arranged in a cylindrical configuration.

59. An apparatus according to claim 55, wherein said electrodes comprises a plurality of rods arranged in a rectangular configuration.

60. An apparatus according to claim 55, wherein said electrodes comprises a plurality of rods arranged in a octagonal configuration.

61. An apparatus according to claim 55, wherein said electrodes form said virtual poles.

62. An apparatus according to claim 55, wherein said apparatus further comprises DC-only electrodes positioned between said virtual poles.

63. An apparatus according to claim 55, wherein said virtual poles form a virtual quadrupole.

64. An apparatus according to claim 55, wherein said virtual poles form a virtual hexapole.

65. An apparatus according to claim 55, wherein said virtual poles form a virtual pentapole.

66. An apparatus according to claim 55, wherein said virtual poles form a virtual octapole.

67. An apparatus according to claim 55, wherein said electrodes are supported on insulating rods.

68. An apparatus according to claim 67, wherein said electrodes on each said insulating rods form a single virtual pole.

69. An apparatus according to claim 68, wherein four of said insulating rods form a virtual quadrupole.

70. An apparatus according to claim 68, wherein five of said insulating rods form a virtual pentapole.

71. An apparatus according to claim 68, wherein six of said insulating rods form a virtual hexapole.

72. An apparatus according to claim 68, wherein eight of said insulating rods form a virtual octapole.

73. An apparatus according to claim 55, wherein all of said electrodes are aligned in parallel.

74. An apparatus according to claim 73, wherein said electrodes are parallel to said virtual poles.

75. An apparatus according to claim 73, wherein said electrodes are perpendicular to said virtual poles.

76. An apparatus according to claim 55, wherein the distance between adjacent electrodes is less than the distance from the center of said apparatus to the closest said electrodes.

77. A method of using a mass analyzer comprising at least one multiple frequency multipole device for guiding, trapping, or selecting ions, wherein said multipole device comprises a plurality of electrodes configured such that ions near the boundaries within said multipole device experience a first electric field and said ions away from the boundaries within said multipole device experience a second electric field.

78. A method according to claim 77, wherein said multiple frequency multipole device is a quadrupole device.

79. A method according to claim 77, wherein said multiple frequency multipole device is a hexapole device.

80. A method according to claim 77, wherein said multiple frequency multipole device is a octapole device.

81. A method according to claim 77, wherein said multiple frequency multipole device comprises a plurality of electrodes.

82. A method according to claim 81, wherein said method further comprises the steps of:

applying an RF potential of a predetermined amplitude and frequency to said electrodes between adjacent virtual poles;

applying a predetermined DC potential to said electrodes between adjacent virtual poles; and injecting ions into said multipole device from an ion source;

wherein the amplitudes of said RF potential and said DC potential and the frequency of said RF potential are chosen so that ions of a selected m/z range pass through said multipole device; and wherein said multipole device is operated in narrow bandpass mode to transmit ions of a selected narrow m/z range.

83. A method according to claim 81, wherein said method further comprises the steps of:

applying an RF potential of a predetermined amplitude and frequency to said electrodes between adjacent virtual poles;

applying an RF potential of a predetermined amplitude and frequency to said electrodes between adjacent actual poles;

applying a predetermined DC potential between electrodes and actual poles; and injecting ions into said multipole device from an ion source;

wherein the amplitudes of said RF potential and said DC potential and the frequency of said RF potantial are chosen so that ions of a selected broad m/z range pass through said multipole device; and wherein said multipole device is operated in broad bandpass mode to transmit ions of a broad m/z range.

84. A method according to claim 77, wherein said mass analyzer comprises at least three multipole devices, at least one of which is a multiple frequency multipole device, and said method further comprises the steps of:

injecting analyte ions into a first multipole device;

setting said first multipole device to a broad bandpass mode, wherein said first multipole device operates at a gas pressure sufficient to collisionally cool said analyte ions;

setting a second multipole device to a narrow bandpass mode, wherein said second multipole device operates at a gas pressure sufficiently low that collisions between said analyte ions and a collisional gas do not interfere with the selection of said analyte ions by said second multipole device;

applying a DC potential between said second multipole device and said third multipole device such that an electric field is produced to accelerate said analyte ions from said second multipole device into a third multipole device; and setting said third multipole device to a broad bandpass mode, wherein said third multipole device operates at a pressure sufficient for collisions to occur between said analyte ions and said collisional gas to produce fragment ions and for said fragment ions to be collisionally cooled;

wherein said fragment ions are detected by a detector.

85. A method according to claim 84, wherein the potential applied to said second multiple device is varied to scan a range of m/z ratios.

86. A method according to claim 77, wherein said mass analyzer comprises at least three multipole devices, at least one of which is a multiple frequency multipole device having at least four virtual poles, and said method further comprises the steps of:

injecting analyte ions into a first multipole device; and setting said multipole devices to broad bandpass modes;

wherein said first multipole device operates at a gas pressure sufficient to collisionally cool said analyte ions.

87. A method according to claim 86, said method comprising the steps of:

applying a first RF potential between said virtual poles, said first RF ptential having a first frequency and a first amplitude.

88. A method according to claim 87, wherein said first RF potential is sinusoidal.

89. A method according to claim 87, wherein said first RF potential is square.

90. A method according to claim 87, wherein said amplitude and said frequency of said first RF potential is chosen to transmit ions within a selected m/z range.

91. A method according to claim 87, wherein a DC offset is applied between adjacent virtual poles.

92. A method according to claim 91, wherein said amplitude and said frequency of said first RF potential and the amplitude and frequency of said DC offset applied between adjacent virtual poles is selected to transmit ions of a narrow m/z range.

93. A method according to claim 92, wherein said amplitude of said first RF potential and said amplitude of said DC offset are varied to scan the desired m/z range.

94. A method according to claim 86, wherein said method further comprises the steps of:

applying a second RF potential between adjacent electrodes within each said virtual pole, said second RF potential having a second frequency and a second amplitude; and applying a DC potential between said DC electrodes and said RF electrodes;

wherein ions of a broad range of m/z ratio values are transmitted through or trapped within said multipole device.

95. A method according to claim 94, wherein the amplitude of either said first RF potential or said second RF potential is approximately zero.

96. A method according to claim 94, wherein said first RF potential or second RF potential is sinusoidal.

97. A method according to claim 94, wherein first RF potential or second RF potential is square.

98. A method according to claim 94, wherein the phase of said second RF potential on said RF electrodes of said virtual pole equal to the phase of said second RF potential between said RF electrodes of adjacent virtual poles, such that the potential difference between said RF electrodes of adjacent virtual poles is minimized.

99. An electronic device for driving a multiple frequency multipole device, said electronic device comprising:

at least two oscillators; and at least two transformers, said transformers comprising a primary coil and at least one secondary coil;

wherein a first oscillator is coupled to a first transformer;

wherein a second oscillator is coupled to a second transformer;

wherein the leads of said secondary coil of said first transformer are connected to the center taps of said secondary coil of said second transformer; and wherein the leads of the secondary coil of the second transformer are connected to electrodes of said multiple frequency multipole device configured such that ions near the boundaries within said multipole device experience a first electric field and said ions away from the boundaries within said multipole device experience a second electric field.

100. An electronic device according to claim 99, wherein said first transformer comprises a primary coil and at least two secondary coils;

wherein said secondary coils are AC coupled together via a capacitor;

wherein the DC offset of a first said secondary coil is controlled via a first power supply and resistor; and wherein the DC offset of a second said secondary coil is controlled via a second power supply and resistor.

101. A method for controlling the potentials applied to a multiple frequency multipole device, said method comprising the steps of:

coupling a first oscillator to a first transformer; and coupling a second oscillator to a second transformer;

wherein said first transformer comprises a primary coil and at least one secondary coil having leads and center taps;

wherein said second transformer comprises a primary coil and at least one secondary coil having leads and center taps;

wherein said leads of said secondary coil of said first transformer are connected to said center taps of the secondary coil of said second transformer; and wherein said leads of said secondary coil of said second transformer are connected to the electrodes of the multiple frequency multipole device configured such that ions near the boundaries within said multipole device experience a first electric field and said ions away from the boundaries within said multipole device experience a second electric field.

102. A method according to claim 101, wherein said first oscillator is set to a first frequency and a first amplitude and said second oscillator is set to a second frequency and a second amplitude such that ions having a broad range of m/z ratios are simultaneously transmitted through said multipole device.

103. A method according to claim 101, wherein said first transformer comprises a primary coil and two secondary coils.

104. A method according to claim 103, wherein said method further comprising the step of:

coupling said secondary coils of said first transformer together via a capacitor;

wherein a first DC offset of a first said secondary coil is controlled via a first power supply and a first resistor; and wherein a second DC offset of a second said secondary coil is controlled via a second power supply and a second resistor.

105. A method according to claim 104, wherein said second oscillator is deenergized and said amplitude and said frequency of said first oscillator and said first and said second DC offsets are adjusted such that ions of a narrow m/z range are transmitted.

106. A method according to claim 101, wherein said first oscillator is set to a first frequency and a first amplitude;

wherein said second oscillator is set to a second frequency and a second amplitude; and wherein said first and second DC offsets are equal.

107. A method according to claim 106, wherein said first and second DC offsets are such that ions of a broad range in m/z ratio values are simultaneously transmitted through said multipole device.

* * * * *